United States Patent
Theunissen et al.

(10) Patent No.: US 10,628,228 B1
(45) Date of Patent: Apr. 21, 2020

(54) TIERED USAGE LIMITS ACROSS COMPUTE RESOURCE PARTITIONS

(71) Applicant: Amazon Technologies, Inc., Seattle, WA (US)

(72) Inventors: Wynand Jan Theunissen, Kirkland, WA (US); Justin J. Tittelfitz, Seattle, WA (US); Saurabh Jain, Redmond, WA (US); Bradley Joseph Gussin, Seattle, WA (US); Shantanu Chandra, Seattle, WA (US); Azbayar Demberel, Seattle, WA (US); John David Dunagan, Redmond, WA (US); Keith A. Carlson, Bainbridge Island, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 285 days.

(21) Appl. No.: 15/688,491

(22) Filed: Aug. 28, 2017

(51) Int. Cl.
*G06F 9/50* (2006.01)
*G06F 9/455* (2018.01)
(Continued)

(52) U.S. Cl.
CPC ........ *G06F 9/5077* (2013.01); *G06F 9/45533* (2013.01); *G06F 9/45558* (2013.01);
(Continued)

(58) Field of Classification Search
CPC ...... G06F 11/0709–1076; G06F 9/5011–5077; G06F 9/45533; G06F 9/45558; G06F 9/5038; G06F 2009/45562–45575; H04W 36/14; H04W 36/22; H04L 29/08135; H04L 29/06823–0685; H04L 29/06911; H04L 41/5041–5054; H04L 63/10–108; H04L 67/30; H04L 67/306; H04L 67/34
See application file for complete search history.

(56) References Cited

U.S. PATENT DOCUMENTS 6,801,543 B1 * 10/2004 Ployer .................. H04J 3/1682
370/322
7,941,804 B1 * 5/2011 Herington ............. G06F 9/5077
712/13

(Continued)

*Primary Examiner* — Brendan Y Higa
(74) *Attorney, Agent, or Firm* — Quarles & Brady LLP

(57) ABSTRACT

Systems for processing requests to use virtual computing resources in communicatively isolated computing environments apply a multi-tier framework for limiting the amount of virtual computing resources that can be allocated to a user in a computing environment. A bottom tier is associated with a user account that has not been analyzed for security risks, a top tier is associated with a user account that has been validated to use a corresponding computing environment; an intermediate tier, having limits between the bottom and top tiers, is applied to computing environments where the user has not requested resources. Initially, all computing environments are on the bottom tier. In response to a valid request for resources, validated computing environments are moved to the top tier and all other computing environments are moved to the intermediate tier. Requests in an intermediate-tier computing environment trigger validity review; the computing environment can move to top tier.

20 Claims, 12 Drawing Sheets

(51) Int. Cl.
   *H04L 12/24* (2006.01)
   *H04L 29/08* (2006.01)
   *H04L 29/06* (2006.01)
(52) U.S. Cl.
   CPC ........ *G06F 9/505* (2013.01); *H04L 29/06823* (2013.01); *H04L 29/08135* (2013.01); *H04L 41/5054* (2013.01); *H04L 63/10* (2013.01); *H04L 67/10* (2013.01); *H04L 67/306* (2013.01); *G06F 9/5038* (2013.01); *G06F 2009/4557* (2013.01); *G06F 2009/45562* (2013.01); *G06F 2009/45575* (2013.01)

(56) References Cited

U.S. PATENT DOCUMENTS

| | | | | |
|---|---|---|---|---|
| 2004/0003087 A1* | 1/2004 | Chambliss | ......... | G06F 11/1076 709/226 |
| 2006/0005082 A1* | 1/2006 | Fossum | ................. | G06F 1/3203 714/42 |
| 2007/0143827 A1* | 6/2007 | Nicodemus | ......... | G06F 21/6218 726/2 |
| 2009/0070769 A1* | 3/2009 | Kisel | .................... | G06F 9/5011 718/104 |
| 2011/0213797 A1* | 9/2011 | Hess | ..................... | G06F 16/242 707/769 |
| 2012/0174196 A1* | 7/2012 | Bhogavilli | .......... | H04L 63/1458 726/5 |
| 2013/0347095 A1* | 12/2013 | Barjatiya | ............ | H04L 63/0209 726/13 |
| 2015/0163716 A1* | 6/2015 | Mahindra | ............. | H04W 36/22 370/230 |
| 2015/0319749 A1* | 11/2015 | Wadhwa | ............... | H04W 12/06 370/338 |
| 2016/0012251 A1* | 1/2016 | Singh | .................. | G06F 21/6254 707/783 |
| 2017/0344618 A1* | 11/2017 | Horowitz | ............ | G06F 11/0709 |

\* cited by examiner

| AGGREGATE USER METRIC VALUE | FIRST RESOURCE TYPE | | | SECOND RESOURCE TYPE | | | THIRD RESOURCE TYPE | | |
|---|---|---|---|---|---|---|---|---|---|
| | 1ST TIER Limit | 2ND TIER Limit | 3RD TIER Limit | 1ST TIER Limit | 2ND TIER Limit | 3RD TIER Limit | 1ST TIER Limit | 2ND TIER Limit | 3RD TIER Limit |
| Range 1 | 0 | 0 | 0 | 0 | 0 | 0 | 0 | 0 | 0 |
| Range 2 | 2 | 2 | 2 | 2 | 2 | 2 | 2 | 2 | 2 |
| Range 3 | 2 | 2 | 5 | 2 | 2 | 5 | 2 | 2 | 3 |
| Range 4 | 2 | 5 | 25 | 2 | 5 | 25 | 2 | 5 | 25 |
| Range 5 | 2 | 5 | 30 | 2 | 5 | 30 | 2 | 5 | 30 |
| Range 6 | 2 | 5 | 40 | 2 | 5 | 40 | 2 | 5 | 40 |
| Range 7 | 2 | 5 | 50 | 2 | 5 | 50 | 2 | 5 | 50 |

TIERED USAGE LIMITS ACROSS COMPUTE RESOURCE PARTITIONS

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. The single physical computing device can create, maintain, delete, or otherwise manage virtual machines in a dynamic manner. In some scenarios, various computing devices may be associated with different combinations of operating systems or operating system configurations, virtualized hardware resources and software applications to enable a computing device to provide different desired functionalities, or to provide similar functionalities more efficiently. Further, virtual machines can themselves be partitioned into multiple isolated virtual systems, called "containers." The virtual machine controls allocation of resources such as processing power and memory, and each container has its own process and network space in which the container can, for example, execute software programs.

In turn, users can request computer resources from a data center, including single computing devices or a configuration of networked computing devices, and be provided with varying numbers of virtual machine resources. Virtualization also scales upward from virtual machines; entire data centers and even multiple data centers may implement computing environments with varying capacities, such as a virtual private network and a virtual private cloud. Computing environments that share a platform can be physically and/or logically isolated from each other to prevent or control data transmissions between the environments. Physical isolation may include, for example, eliminating network communication between servers of different computing environments. Logical isolation can be achieved in many ways, such as by placing a computing environment's network access onto a private subnet and/or virtual private network, or by requiring user authentication to access any interfaces with the computing environment. User-directed resource allocation may span multiple isolated computing environments, providing flexibility to serve geographically diverse end-users and establish data redundancy, load balancing, and other efficiencies.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1:
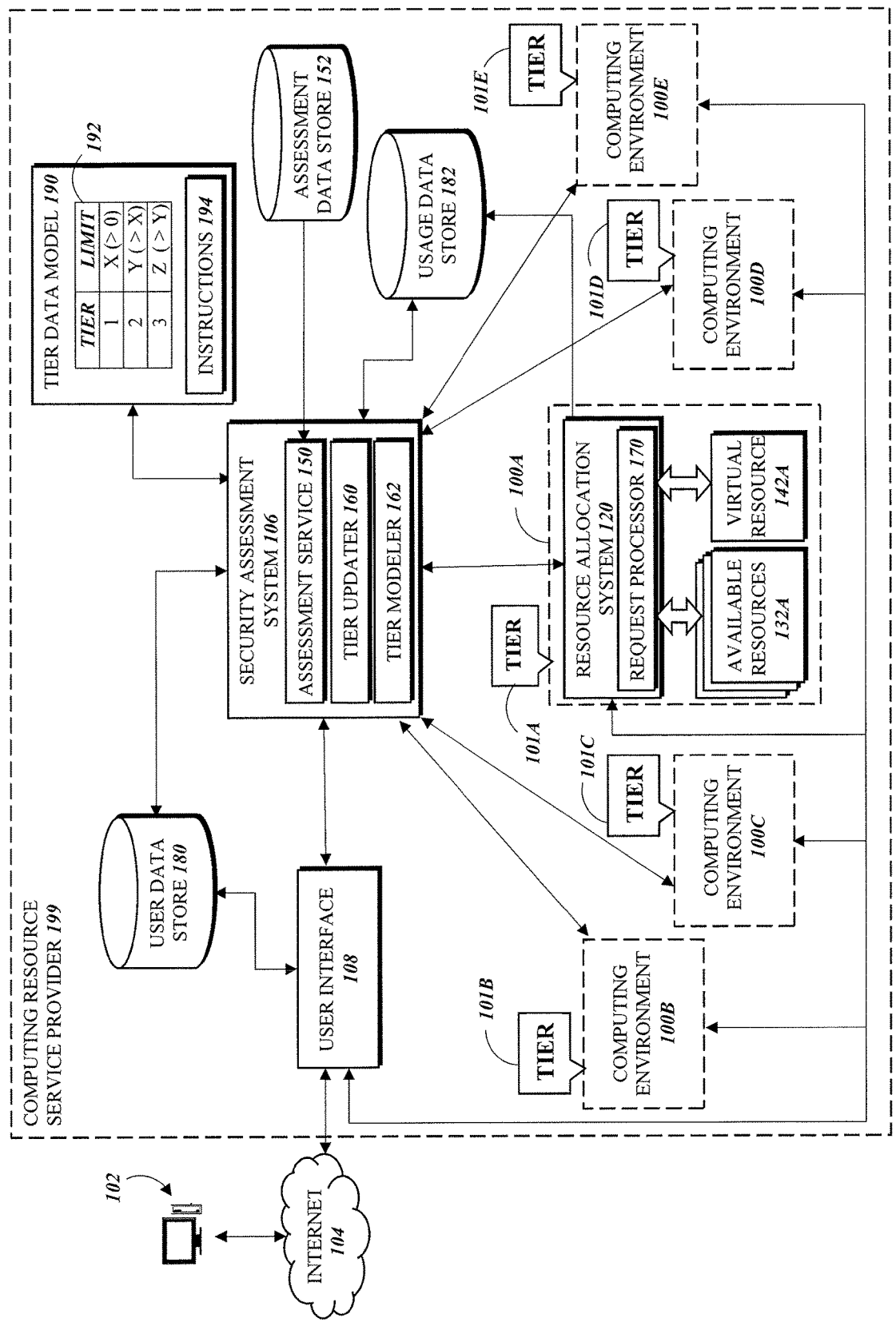
FIG. 1 is a diagram illustrating an example system for using tiered limits to manage computing resource allocation within isolated computing environments, in accordance with the present disclosure.

Developers that use computing environments, such as a virtual networks, to perform computing operations (e.g., execute code, including threads, programs, software, routines, subroutines, processes, etc.) are faced with difficulties in selecting and customizing the proper type, size, number, and duration of compute resources in accordance with their needs. Other concerns that they might have include over-utilization (e.g., acquiring too little computing resources and suffering performance issues), under-utilization (e.g., acquiring more computing resources than necessary to run the codes, and thus overpaying), prediction of change in traffic (e.g., so that they know when to scale up or down), and instance and language runtime startup delay, which can take 3-10 minutes, or longer, even though users may desire computing capacity on the order of seconds or even milliseconds. Additionally, the computing environments may be implemented on computing infrastructure that is physically or logically divided into partitions that are communicatively isolated from each other. The developer may need to configure deployment of the developer's software into several of these partitions in order to reach all of the end users of the software and/or to create efficiencies such as failover access, data redundancy, load balancing, and security breach remediation.

There are many reasons that a service provider of a system partitions (i.e., isolates) computing environments. Some relevant reasons for partitioning include: managing geographically co-located or proximal physical resources, including servers and data centers; serving resource requests on a geographic basis to optimize response time; handling system failures (e.g., by moving system traffic from a failed or failing partition to a functioning one); and, containing system security breaches through partition independency. A valid user (e.g., the developer described above) may wish to launch resources in a single computing environment, in some of the isolated computing environments, or in all of the isolated computing environments within the service provider's system. Furthermore, such environment-spanning may be scaled up as the launched resources (e.g., resources executing the developer's software) attract more end users. From a system security perspective, there is risk involved in allowing a user to launch resources in every computing environment: the entire system can be exposed to an attack or other unauthorized use, or to a virus, malware, or other code that can compromise physical and/or virtualized resources.

Systems can perform an initial security assessment of a user's first request to launch resources in one or more of the computing environments, such as a first region which in some embodiments includes resources located generally in the same geographical area (e.g., one or more data centers that operate independent from one or more data centers in a different region). For example, the system may allow the first request to proceed (i.e., the system allocates and launches the requested resources) in an initial "home" computing environment, but may restrict or prevent launch of any additional resources in the home computing environment and of any resources in other computing environments while a security assessment is performed. If the system determines that the user's resource launch requests are unlikely to present a security threat, the system may lift the restrictions and a user may launch resources in any of the isolated computing environments. In one example of such restrictions, the system may maintain limits on the number, in each computing environment, of instances (e.g., virtual machines or instances that run directly on the hardware of a server) that can be concurrently executing to perform tasks for the user; both authorized and unauthorized launch requests may be denied if the relevant computing environment is already executing the maximum number of instances allowed under the imposed limit. At the first launch request, a first limit may be applied to the computing environments; once the security assessment is complete, the first limit may be raised to a second limit indicating the user's request passed the assessment.

The present systems and methods provide additional approaches for managing a valid or invalid/compromised user's access to compute resources of a system that includes multiple computing environments. In various embodiments, the present disclosure describes the application of multiple tiers of dynamic limits on the amount of resources in each computing environment that can be controlled by a user. These limits and their application are based on input from an administrator of the account of the user or automatically by the service provider based on identified differences between the launch request behavior of a valid user and that of an invalid or unauthorized user or a user whose account or control of resources has been compromised. In particular, behavioral analysis shows that in a system with multiple computing environments, such as isolated "regions" of the system as described above, valid users may first make requests to launch resources one or a few regions and expand to new regions slowly; in contrast, invalid or unauthorized users typically attempt to launch as many instances as possible, in as many regions as possible, in a short time period. However, some valid users can make a large number of requests and/or can try to expand to many or all regions more quickly than a typical valid user. The present systems maintain multiple tiers of regional limits, for example controlling the number of instances an account can launch, and analyze launch requests from the account in order to establish initial limits for the various computing environments and move the limits according to the tiers and the behavior of the account. The present systems thus refine the control of resource launch limits, balancing security concerns with appropriate resource allocation to valid users. Additionally, in some embodiments an administrator of an account can configure the system to prevent scaling out to many or all regions quickly, to control how users in the account use the services offered by the service provider.

In certain embodiments, elements of the system facilitate processing of event messages, such as resource requests, that trigger allocation and/or launch of virtual computing resources associated with an account of a particular user. The processing may be performed according to a multiple-tier framework for applying limits to the resource allocation. In one non-limiting example, a first tier may include the most strict limits, such as allowing zero new resources to be allocated in each of the computing environments; a second tier may include less strict limits that the first tier, allowing a "limited" maximum amount of new resources to be allocated, the limited maximum being higher than the amount allowed in the first tier; and, a third tier may include the least strict limits, which may be "no limit" in some embodiments, or alternatively may be an "open" maximum (i.e., associated with the user account passing a security assessment) amount of new resources to be allocated. The actual value of the limits in each tier may be predetermined and may be uniformly applied to all user accounts, or the limits in some or all of the tiers may be dynamically determined based on parameters associated with the user account and/or on metrics determined by analyzing various aspects of the use of the system. For example, the limits in the second and third tiers may be based on assessment scores associated with resource requests on which a security assessment has been performed; a higher assessment score, indicating a resource request associated with a user is likely to be authorized, may correspond to higher limits in the second and third tiers, relative to a lower assessment score indicating less confidence that the user and/or resource request is valid.

The system may assign a limit from one of the tiers to each of the computing environments; in addition to the tiers of limits themselves, the multiple-tier framework may include processing instructions for selecting the limit/tier to apply to a particular computing environment in a particular situation. The limit/tier assignment may be dynamic, in that the system may initially associate a particular computing environment with a particular tier, and may later "move" the computing environment to a different tier based on system activity, such as performing security assessments on previously and/or contemporaneously received resource requests. In one non-limiting example, the processing instructions may cause the system to assign the tiered limits to the computing environments as follows: after a user creates a user account with the system, the system receives a first request to allocate resources associated with the first user's account; at this "first launch request," the system may cause the requested resources to be allocated in a first computing environment, and then applies the first tier limits to all computing environments; the system then causes the security assessment to be run against the first launch request and/or the resources allocated in the first computing environment; if the security assessment indicates that the first launch request is valid and is from a valid user, the system moves a subset of the computing environments, including the first computing environment and optionally including one or more other "common" computing environments, to the third tier of limits and all other computing environments not in the subset to the second tier of limits; when the system receives a second request, associated with the user, to launch resources in a second computing environment having the second tier of limits, the system launches the resources in the second computing environment (if the limited maximum is not reached) and then performs the security assessment on the second request and/or the newly allocated resources; if the security assessment indicates that the second launch request is valid and is from a valid user, the system moves the second computing environment from the second tier to the third tier of limits.

The one or more intermediate tiers of limits, combined with the gradual validation (i.e., by moving less-used computing environments through multiple tiers) of resource activity, enables the system to maintain precise control over a user's expansion into multiple isolated computing environments and associated scaling of virtual computing resource consumption. In particular, activity in each computing environment outside the first approved subset can be assessed for security risks when the specific activity is first requested there, with intermediate limits allowing some activity in light of the "home" computing environment's activity having already been validated. Such a computing environment is only assigned to the highest tier if the system obtains a favorable security assessment of the specific activity within that computing environment. This allows for more reliable security assessments for a particular computing environment; as a result, the highest resource limit may be safely increased over that of existing systems that validate the user's activity in all computing environments at once. Additionally, if a resource-consuming attack is launched in a computing environment having intermediate-tiered limits, the extent of potential damage and corresponding errors is correspondingly limited. The user may provide (e.g., via a user device accessing an application programming interface ("API")) configuration information that affects the tiered limits, and may receive alerts when limits are reached, settings are changed, and/or the system detects unauthorized activity related to the user's account.

The performance of the system's processing of resource requests may be monitored for a test period (e.g., two days; one million requests) to determine if the request processing is efficiently managing resources, in any scope from a single user to a global analysis. For example, the system may collect and analyze data to determine whether one or more of the limits are set too low (i.e., causing too many "limit reached" errors for valid requests) or could be set lower. Adjustments to the multiple-tier framework can be made, automatically in some embodiments, and the subsequent processing further monitored for changes. A tiered-limiting model may be developed to describe the programmatic event-handling information that can set the optimal tiered limits based, e.g., on global and/or user-specific information, known threat/security risk information, security assessment results, the type(s) of resource(s) being requested, the type of activity being requested, and the like. Metadata of incoming requests and other event messages, execution logs of past activity, network monitoring data, performance data, and user-provided parameters such as "blacklist" or "whitelist" of excluded or approved computing environments, may all be suitable inputs to the data model; the resulting programmatic event-handling information functions as a set of rules for maintaining multiple tiers of limits, for initiating security assessments, and for allowing and/or denying resource requests, event messages, and other triggers.

Referring to FIG. 1, embodiments of the present disclosure may operate within or upon computing systems of a computing resource service provider 199 accessible by users (e.g., developers, website visitors, etc.) of user computing devices 102 via a computer network 104 such as the internet. The computing resource service provider 199 implements a plurality of computing environments 100A-E in which users may obtain virtual computing resources that enable the users to run programs, store, retrieve, and process data, access services of the computing resource service provider 199, and the like. The computing environments 100A-E may each be one of any suitable type and/or configuration of a compute resource virtualization platform implemented on one or more physical computing devices. Non-limiting examples of computing environments 100A-E include data centers, clusters of data centers organized into zones or regions, a public or private cloud environment, and the like.

In some embodiments, the computing resource service provider 199 includes one or more logical and/or physical barriers that render the computing environments 100A-E completely independent of each other—there is no automatic sharing or replication of compute resources or stored data, and there are no communication channels between the computing environments 100A-E. In another embodiment, the computing environments 100A-E may be isolated from each other (e.g., implemented in geographically disparate data centers) except for a low-latency data link between them. As used herein, any two physical or virtual computing devices, resources, data stores, networks, etc., that suffer such transmission difficulties are said to be "communicatively isolated" from each other. The computing resource service provider 199 may include data processing architecture that implements systems and services that operate "outside" of any particular computing environment 100A-E and perform various functions, such as managing communications to the disparate computing environments 100A-E, providing electronic data storage, and performing security assessments and other data analysis functions. These systems and services may communicate with each other, with devices and services outside of the computing resource service provider 199, and/or with the computing environments 100A-E.

In general, the user computing devices 102 can be any computing device such as a desktop, laptop, mobile phone (or smartphone), tablet, kiosk, wireless device, and other electronic devices. In addition, the user computing devices 102 may include web services running on the same or different data centers, where, for example, different web services may programmatically communicate with each other to perform one or more techniques described herein. Further, the user computing devices 102 may include Internet of Things (IoT) devices such as Internet appliances and connected devices. A user interface 108 may provide the connection of user computing devices 102 to various systems, services, and resources of the computing resource service provider 199. Such systems, services, and resources may have their own interface for connecting to other components, some of which are described below. Although one or more embodiments may be described herein as using a user interface, it should be appreciated that such embodiments may, additionally or alternatively, use any CLIs, APIs, or other programmatic interfaces.

A network 104 that connects the user device 102 to the computing resource service provider 199 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. In some embodiments, the network 104, may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Accordingly, a user of a user device 102 may access the computing resource service provider 199 via the user interface 108, which may be any suitable user interface that is compatible with the user device 102 and the network 104, such as an API, a web application, web service, or other interface accessible by the user device 102 using a web browser or another software application, a command line interface, and the like. In some embodiments, the user interface 108 may include code and/or instructions for generating a graphic console on the user device 102 using, for example, markup languages and other common web technologies to present the user with various options for configuring, requesting, launching, and otherwise operating virtual computing resources in one or more of the computing environments 100A-E. User input (e.g., text, computer files, selected elements from a list or menu, mouse clicks on buttons, and other interactions) entered into the user interface 108 by the user may be received and processed by one or more components of the computing resource service provider 199, such as the security assessment system 106, a user data store 180, and/or one or more components in the computing environments 200A-E, such as the corresponding resource allocation system 120 of each computing environment 200A-E.

For example, the user may use the user interface 108 to create a user account and register the user account with the computing resource service provider 199. Such a registration process may generate records describing the user account and store the user account records in the user data store 180. The records may include information indicating that the user associated with the user account is authorized or approved to request and use virtual computing resources in one or more of the computing environments 100A-E. The information may describe limitations on the user's ability to use virtual computing resources. For example, user account information may specify the types of virtual computing resources the user is allowed to request. During or after the registration process, the user may further input other information describing a profile of the user, various preferences of the user, and/or configuration settings that the system may later use to determine limits on the allocation of virtual computing resources in accordance with the present disclosure.

Any particular computing environment 100A may be configured to provide compute resources to users that are authorized to use all or part of the computing environment 100A. Compute resources can include, for example, any hardware computing device resources, such as processor computing power/capacity, read-only and/or random access memory, data storage and retrieval systems, device interfaces such as network or peripheral device connections and ports, and the like. In some embodiments, these resources may be dispersed among multiple discrete hardware computing devices (e.g., servers); these hardware computing devices may implement or communicate with a virtualization layer and corresponding virtualization systems (e.g., a hypervisor on a server), whereby the compute resources are represented by, and made accessible as, virtual computing resources. A virtual computing resource may be a logical construct, such as a data volume, data structure, file system, and the like, which corresponds to certain compute resources. Non-limiting examples of virtual computing resources include virtual machines and containers (as described below), logical data storage volumes capable of storing files and other data, software programs, data processing services, and the like.

The computing environment 100A may be configured to allocate compute resources of corresponding hardware computing devices by virtualizing those resources to produce a fixed or variable quantity of available virtual computing resources 132A. The available resources 132A may be provided in a limited manner to one or more users that submit requests for virtual computing resources within the computing environment 100A; such resources that are allocated to and/or in use by a particular user are represented by virtual resource 142A. Various functions related to processing requests to use virtual resources, to otherwise managing the allocation and configuration of the available resources 132A and allocated virtual resources 142A, and to limiting the amount of virtual resources 142A that are allocated to a particular user in accordance with the present systems, may be performed by one or more services executing within the computing environment 100A and/or outside of it (i.e., in the data processing architecture of the computing resource service provider 199).

In some embodiments, as illustrated in FIG. 1, a resource allocation system 120 operating within each of the computing environments 100A-E (for clarity, only the resource allocation system 120 of a first computing environment 100A is shown) may cooperate with a security assessment system 106 implemented outside of the computing environment 100A to manage the allocation of virtual resources according to tiered limits. In some embodiments, the resource allocation system 120 receives at least the communications that contain requests, commands, instructions, and the like (collectively herein, "requests"), to allocate, launch, execute, run, or otherwise provide, for use by an identifiable user (e.g., the requesting user or another specified user), one or more virtual computing resources in one or more of the computing environments 100A-E. The request received by the security assessment system 106 may be generated directly by the user (e.g., using the user interface 108 as described below), or the request may be generated as, or in response to, an output (e.g., a trigger event message) of another component of the computing resource service provider 199 or of an external device.

The resource allocation system 120 may include one or more services, implemented in software or hardware devices, for performing pertinent tasks. In some embodiments, the resource allocation system 120 may include a request processor 170 which is configured by executable program instructions to receive a request for virtual computing resources, parse the request into delivery and other parameters, determine whether the request can be fulfilled based on the available resources 132A and other parameters, and if the request can be fulfilled, provide a virtual computing resource 142A configured for use by the requesting user according to the parameters of the request. The request processor 170 may additionally be configured to send the request, or some or all of the data contained in the request or describing the request, to the security assessment system 106 for associated processing as described herein. The request processor 170 or another component of the resource allocation system 120 may be configured to send to the user interface 108 information related to processing the request, such as error, completion, and other status messages.

The resource allocation system 120 may additionally collect and/or generate usage data describing aspects of the virtual computing resource 142A. Non-limiting examples of such usage data may include: configuration and/or status parameters of the virtual computing resource 142A at the time of launch or failure to launch; information related to the processing of a request to use virtual computing resources; monitoring data collected by monitoring virtual computing resource 142A operations, such as network communications, data storage and retrieval and other disk access operations, execution of software programs, and the like; and, state data such as a snapshot of the state of the virtual computing resource 142A at the time it terminates, fails, or generates an error, or at any other time. The usage data may be stored in a usage data store 182 of the computing resource service provider 199. Additionally or alternatively, the usage data store 182 for a computing environment 100A may be implemented within the computing environment 100A itself. The usage data stored in the usage data store 182 may be accessible only to the corresponding user to which the virtual computing resource 142A was allocated, or may be accessible by certain other systems and/or services. For example, the security assessment system 106 may, by default or by user authorization, access and use the usage data of one user or multiple users to update a dynamic tier data model 190 as described further below.

The security assessment system 106, based on the tier data model 190 and the results of security assessments performed on user data, determines and sets the limits on virtual computing resources allocated to a particular user within each computing environment 100A-E. The security assessment system 106 may, in some embodiments, be a global (i.e., in communication with all computing environments 100A-E) system, and may be implemented in the data processing architecture of the computing resource service provider 199. For example, the security assessment system 106 may be part of a control plane that processes some of all of the network communications going into and coming out of the computing environments 100A-E. In other embodiments, the security assessment system 106 may include one or more components, such as services, that are distributed within and across the computing environments 100A-E. One or more component services, implemented in software or hardware, may perform the various discrete tasks described herein, or in some embodiments may cause them to be performed by other services. For example, in some embodiments the security assessment system 106 may itself perform security assessments of identified data, while in other embodiments the security assessment system 106 may send requests to another service external to the security assessment system 106 for assessment.

The security assessment system 106 may include an assessment service 150 that is configured to apply any suitable security assessment algorithms, to available data in order to determine whether the corresponding user is a valid user and/or whether a request received by a resource allocation system 120 is a valid request for the requested virtual computing resource. Generally, determining whether a user or a request is valid entails first determining the value(s) of one or more metrics describing a likelihood that the request is authorized, and thus will generate valid activity, rather than damaging, fraudulent, or otherwise malicious activity, within a system (i.e., the computing environment(s) 100A-E or the computing resource service provider 199). The value(s) of the metric(s) are then compared to one or more thresholds, which may be predetermined value(s)/range(s) of values of the metric(s). In some embodiments, a validity determination may be a "yes" or "no" proposition: if the value of the user metric does not meet or exceed a single threshold, the request is classified as not valid. In other embodiments, the system may be configured to evaluate multiple levels of confidence that the user and the request are valid, and there may be multiple thresholds and/or ranges of values each representing a corresponding level of confidence. The specific metrics and thresholds guiding a determination as to whether a user or a request is valid, as well as the security assessments scoring algorithms, and other methods for producing values for the metrics, can depend on many different aspects of particular implementations of the presently described systems. While some examples are described herein, the present systems are not limited to any particular approach to measuring the likelihood that activity is valid.

The assessment service 150 algorithms may be stored in an assessment data store 152. Additionally or alternatively, the assessment data store 152 may contain rules or rule sets that configure the assessment service 150 to apply one or more of the algorithms in accordance with predetermined parameters. Operating on target data, the assessment service 150 produces results that correspond to the desired user metric framework, as described above. In various embodiments, the user metric may be designed to assess fraud risk associated with the account, and may be based on various attributes available at account creation (payment instrument information, relevant geolocation data, etc.). The assessment may be made, in various embodiments, using machine learning and other statistical models, and based on comparisons to historical patterns. The security assessment system 150 may be configured to produce results based on any available data, including without limitation any or a combination of: user data, such as user account information and user-supplied or automatically generated user profile data; usage data, such as data describing activity of virtual computing resources launched by the user or by other users; results from other security assessments, such as other types of assessments or previous assessments of the same type; and, information included in a request for virtual computing resources.

In some embodiments, the assessment data store 152 may include values for the security assessment parameters that are supplied by an administrator of the corresponding user account. For example, an API such as the user interface 108 may present prompts (e.g., graphically on the user device 102) for the administrator to enter values for any suitable parameter, such as acceptable or unacceptable computing environments 100A-E or rates of expansion; the administrator may enter the values, and the security assessment system 106 may receive the values and store them in the assessment data store 152 in association with the user account. Such parameters and their associated values may be used as factors in the assessments (e.g., determination of the validity or authorization of a user or a requested action); thus, the administrator may identify what constitutes allowable (i.e., valid) request activity, changing the parameters (e.g., use of regions, rate of expansion) that the assessment service 150 will permit, if necessary.

The assessment service 150 may further obtain data from other sources to determine how the user, user account, or request should be assessed. For example, the assessment service 150 may use the request parameters to query a user data store 180 that stores user account information, user profiles, and other data related to users of the computing resource service provider 199; the assessment service 150 may obtain user data for the relevant user associated with the request, including for example user preferences, user-submitted configuration settings, user account security information, and the like. Such user preferences and/or user-submitted configuration settings may be, for example, values for the parameters described above, which the assessment service 150 uses as factors in the assessments. In another example, the assessment service 150 may identify, from the request, the relevant user and one or more parameters describing the virtual computing resource being requested, such as a type of resource (e.g., a virtual machine or a specific type of virtual machine); the assessment service 150 may use this information to query the usage data store 182 and obtain information that can be used to further configure the request processing, such as to identify which assessments and/or assessment rules should be applied.

In some embodiments, the security assessment results may be stored in the user data store 180 (e.g., in the corresponding user account records); to determine validity, the security assessment system 106 may simply retrieve the security assessment results from the user data store 180 and make the comparison to a stored threshold. In other embodiments, the validity comparison may be made in advance and the security assessment system 106 may retrieve the results of the comparison. In still other embodiments, the security assessment system 106 may send the security assessment result(s) to the corresponding resource allocation system 120, or another service, within a computing environment 100A, which service may then make the comparison to the stored threshold(s).

The present systems and methods can be used to implement tiered "regional" limits on the amount of virtual computing resources that can be concurrently allocated to a particular user in each of the computing environments 100A-E. The limits may be defined by a tier data model 190, which may be a data structure, record or collection of records, file or collection of files, or another arrangement of data that can be maintained in a memory module or electronic data store accessible by the resource allocation system. The tier data model 190 may include a multi-tier framework 192 that defines a plurality of sequentially arranged tiers and at least one value associated with each tier and quantifying the maximum amount (i.e., the limit) of virtual computing resources that the corresponding tier accommodates. The illustrated multi-tier framework 192 is a simple example in which there are three tiers each having a single associated limit, wherein the limits progressively increase and the lowest limit is greater than zero. Other, more complex examples are described herein, and the possible configurations of the multi-tier framework 192 are not limited by the described examples. The multi-tier framework 192 can include any number of tiers, though the advantages of the present system are best realized when there is at least one "intermediate" tier having one or more limits that fall between a "bottom" tier having the lowest (i.e., most restrictive) limits, and a "top" tier having the highest (i.e., least restrictive) limits. The multi-tier framework 192 may additionally or alternatively define multiple limits within a single tier, such as when each of the limits is associated with one or more other parameters as described below.

The tier data model 190 may further include instructions 194 that are readable by the security assessment system 106. In some embodiments, the security assessment system 106 may include a tier updater service 160 that may be configured to use the instructions 194 to determine how to identify the correct tier for a given computing environment 100A based on the request and/or the user data. Thus, using the tier data model 190, the tier updater service 160 may assign to each computing environment 100A-E a corresponding tier 101A-E that governs the limits on concurrently executing virtual computing resources. In various embodiments the limits may be applied to the users that are able (i.e., authorized, such as by maintaining a registered user account) to request and use virtual computing resources in any of the computing environments 100A-E in different ways: in one embodiment, the assignment of a tier 101A-E applies to all users, and thus each computing environment 100A-E is assigned to one tier at a time; in other embodiments, the assignment of a tier 101A-E applies only to a subset of users or to each individual user, and a particular computing environment 100A has an assigned tier 101A corresponding to each user (e.g., the tier 101A is Tier 0 for User A and Tier 1 for User B) or to each subset of users.

Thus, processing a request for virtual computing resources in a particular computing environment 100A takes into account the assigned tier 101A. In one embodiment, the request processor 170 or another service of the computing environment 100A determines the assigned tier 101A and determines whether the associated limit has been reached before approving and executing the request. For example, the resource allocation system 120 may maintain a current record of the amount of virtual computing resources concurrently executing in the computing environment 100A; the request processor 170 may query the resource allocation system 120 to get the current amount of virtual computing resources concurrently executing in the computing environment 100A, for comparison to the relevant limit. In another embodiment, the security assessment system 106 may send an indicator identifying the assigned tier 101A and/or the associated limit(s) to the resource allocation system 120, or may store the indicator in a location accessible to the resource allocation system 120; the resource allocation system 120 in turn may be configured to, upon receipt of a request, obtain and read the indicator to determine the applicable limit and whether it has been reached.

The security assessment system 106 may further be configured to update the tier data model 190, such as in the methods described in detail below. The security assessment system 106 may include a tier modeler 162 that is implemented in hardware and/or software and incorporates newly generated data into the tier data model 190 to update limits and/or instructions 194. The newly generated data may be usage data (i.e., obtained from the usage data store 182) that describes how the system is operating under the current limits; if the system is producing an unacceptable number of errors or is otherwise operating inefficiently, the limits may be increased or decreased to address the problems. The tier modeler 162 may use other data, such as current individual or aggregate user metrics, user preferences, user-supplied configuration settings, and the like, to update the tier data model 190.

FIGS. 2A-E present example operations, within a computing resource service provider 299 (which may be identical or similar to the computing resource service provider 199 of FIG. 1, or may be an entirely different type of system), by which a security assessment system 206 (as described above with respect to the security assessment system 106 of FIG. 1) manages the assignment of computing resource environments 200A-E to tiers of a multi-tier framework (e.g., of the tier data model 190 of FIG. 1) in response to legitimate system activity. The example of FIGS. 2A-E is directed to limiting the number of instances (e.g., virtual machine instances or physical machine instances) that a particular user can launch within a particular network-accessible services system 210A, 210D that executes within a particular computing environment 200A, 200D and is associated with the user. It is contemplated that the described operations can be adapted, without undue experimentation, for use on any type of instances. For example, a message queuing service may receive the tiers or limits for each user from the resource allocation system 202, or may read the tiers/limits directly from the local account tiers data store 252A, as described below; in this case the limits may be limits on the number of messages associated with the corresponding user that can be concurrently stored in a queue.

The resource allocation system 202 of each computing environment 200A-E may perform any of the operations described above with respect to the resource allocation system 120 of FIG. 1. In particular, the resource allocation system 202 may receive requests to launch virtual machine instances within the corresponding computing environment 200A-E. In addition to sending the request, or parsing the request into parameters and sending some or all of the parameters, to the security assessment system 206, the resource allocation system 202 sends the request to a frontend 220 of a network-accessible services system 210A corresponding to the user associated with the request. The resource allocation system 202 may also receive messages from the security assessment system 206 that contain instructions and values for updating one or more tiers and/or one or more tiers for one or more of the users that have access to the computing environment 200A. For example, the resource allocation system 202 may maintain a database, data store, or other stored data structure that contains a record for each user that has a valid user account and permission to use virtual computing resources within the computing environment 200A. Such records may include a user identifier and sufficient information for the resource allocation system 202 and/or the frontend 220 or request processing module 222 to determine the assigned tier and/or limit that is applicable for the user and the request received. Detailed examples of this information are described below. Thus, the example data store is a "local" account tiers data store 252A.

In another example, the local account tiers data store 252A as described may cooperate with a "master" account tiers data store 250 that is maintained, outside of any computing environment 200A-E, by the security assessment system 206. The master account tiers data store 250 may store data having the same data structure as the local account tiers data store 252A (i.e., records comprising a user identifier and tier and/or limit information), but for all computing environments 200A-E and for all authorized users of any of the computing environments 200A-E. The security assessment system 206 may update the information in relevant records of the master account tiers data store 250 every time a change must be made to current tier or limit values, or to user data. The resource allocation system 202 of each computing environment 200A-E may periodically query the master account tiers data store 250 to obtain new "local" data for its users, and/or the security assessment system 206 may send a message to the resource allocation system 202 to trigger such a query, and/or the security assessment system 206 may push changes to the relevant computing environment's 200A-E data by directly sending the new data to the resource allocation system 202.

The network-accessible services systems 210A,D are depicted as operating in a distributed computing environment including several computer systems (e.g., servers 202, 272) that are interconnected using one or more computer networks. The network-accessible services systems 210A, 210D could also operate within a computing environment having a lesser or greater number of devices than are illustrated in FIGS. 2A-E. Additionally, while each network-accessible services system is not illustrated, it is contemplated that the user may be associated with a distinct network-accessible services system in some or all of the computing environments 200A-E; the network-accessible services systems associated with the user may all have the same configuration, or all different configurations, or a combination thereof. Thus, the depictions of the network-accessible services systems 210A (in FIGS. 2A-C), 210D (in FIGS. 2D-E) should be taken as illustrative and not limiting to the present disclosure. For example, the network-accessible services systems 210A, D or various constituents thereof could implement various Web services components, hosted or "cloud" computing environments, and/or peer-to-peer network configurations to implement at least a portion of the processes described herein.

Further, a particular network-accessible services system 210A may be implemented in hardware and/or software and may, for instance, include one or more physical or virtual servers implemented on physical computer hardware configured to execute computer executable instructions for performing various features that will be described herein. The one or more servers 202 may be geographically dispersed or geographically co-located, for instance, in one or more data centers. In some embodiments, the network-accessible services system 210A may be disposed in a computing environment 200A that is communicatively isolated from the other computing environments 200B-E of the computing resource service provider 299, as described above. The computing environments 200A-E may, in some embodiments, be "regions" of an overarching compute resource network implemented by the computing resource service provider 299; these regions may be independent of each other, and may represent a geographic area (e.g., Eastern United States, Western United States, and Europe may all be regions) of the overarching compute resource network. Such independence may mean that the compute resources made available in a particular region are dedicated to that region and are controlled by a regional instance of the network accessible services system, so as to isolate the region from other regions.

The network-accessible services system 210A may be connected to a communication network 204 that is implemented by or within the computing environment 200A. In some embodiments, any of the components within the network-accessible services system 210A can communicate with other components of the computing environment 200A via the network 204. In other embodiments, not all components of the network-accessible services system 210A are capable of communicating with other components of the computing environment 200A. In one example, only the frontend 220 may be connected to the network 204, and other components of the network-accessible services system 210A may communicate with other components of the computing environment 200A via a frontend 220. Additionally, the network 204 may be used to communicate with systems and resources inside the computing environment 200A, such as the resource allocation system 202 and the local account tiers data store 252A, and/or outside of the computing environment 200A, such as the security assessment system 206 and other systems and resources in the data processing architecture of the computing resource service provider 299.

The network-accessible services system 210A includes a frontend 220 that provides interfaces for exchanging data with external resources and devices, including a network interface 224 for sending and receiving data over communication networks, for example to communicate with the security assessment system 206. In one embodiment, the frontend 220 serves as a front door to all the other services provided by the network-accessible services system 210A. The frontend 220 receives and processes (e.g., using a request processing module 222) all of the requests to launch virtual machine instances within the network-accessible services system 210A. The frontend 220 may receive such requests using any suitable protocols, including, for example, HTTP, MQTT, and CoAP, as discussed above. Any metadata or other information (e.g., headers and parameters) included in the request may also be used to process the request.

Additionally, the frontend 220 may process messages from the security assessment system 206 and/or the resource allocation system 202 that configure the frontend 220 to apply the associated limit(s) derived from the multi-tier framework. Alternatively, the frontend 220 may process and respond to messages from the resource allocation system 202 and/or the security assessment system 206 requesting information, such as the number of virtual machine instances associated with the user and concurrently executing on the network-accessible services system 210A. The frontend 220 may also process and respond to messages from the resource allocation system 202 and/or the security assessment system 206 requesting other information, such as usage data describing the execution of a particular virtual machine instance; or, the frontend 220 may be configured to automatically, such as at a particular time or in response to an event, send such information to the resource allocation system 202 or to a data storage service.

The frontend 220 may communicate with other components of the network-accessible services system 210A in order to launch and manage instances. For example, frontend 220 can include components such as a data store that stores information such as information about the currently running instances (i.e., identifiers of the instances, the servers the instances are running on, etc.) pending requests received to launch or terminate instances, as well as information about the slots available to host additional instances. The data store can be coupled to a scheduling service, which can use the data stored therein to launch and terminate virtual machines. The frontend 220, scheduling service, or another instance manager may manage an active pool 240A of virtual machine instances that are associated with a user/user account and that have been launched and are concurrently executing within the computing environment 200A.

In some embodiments, the scheduling service can be configured based on a predetermined set of configurations, such as the tiered limits. As such, the network-accessible services system 210A can launch or terminate instances associated with a user based on the tired limits. In some embodiments, the network-accessible services system 210A may enable controlling (e.g., increasing or decreasing) the available capacity in the active pool 240A. For example, a system administrator may use a setting represented in a user interface to increase the capacity (i.e., the maximum number of instances) in the active pool 240A during peak hours. In some embodiments, virtual machine instances in the active pool 240A can be configured based on a predetermined set of configurations, such as virtual machine images that incorporate settings pertaining to the tiered limits. The predetermined set of configurations can correspond to various types of virtual machine instances; for example, the active pool 240A can be configured to hold up to the limit of each type of virtual machine instance. The active pool manager can optimize types and numbers of virtual machine instances in the active pool 240A based on one or more metrics related to current or previous launch requests.

As described, the active pool 240A is a group (sometimes referred to as a pool) of virtual machine instances that are currently allocated to one or more users and are executing in response to a request to launch a virtual machine instance. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) and the tiered limits may be applied to the security group rather than individual users.

In some embodiments, the frontend 220 or a scheduling service managing the active pool 240A may maintain a list of instances in the active pool 240A. The list of instances may further specify the configuration (e.g., type, OS, etc.) of the instances. The frontend 220 and/or the resource allocation system 202 may have access to this list and may use it to determine whether the tiered limit on concurrently executing virtual machine instances has been reached. In another embodiment, the frontend 220 or scheduling service may be configured to determine the assigned tier and/or the associated limits for the computing environment 200A, and may reject a command to launch another instance if the associated limit has been reached.

Figure 2A:
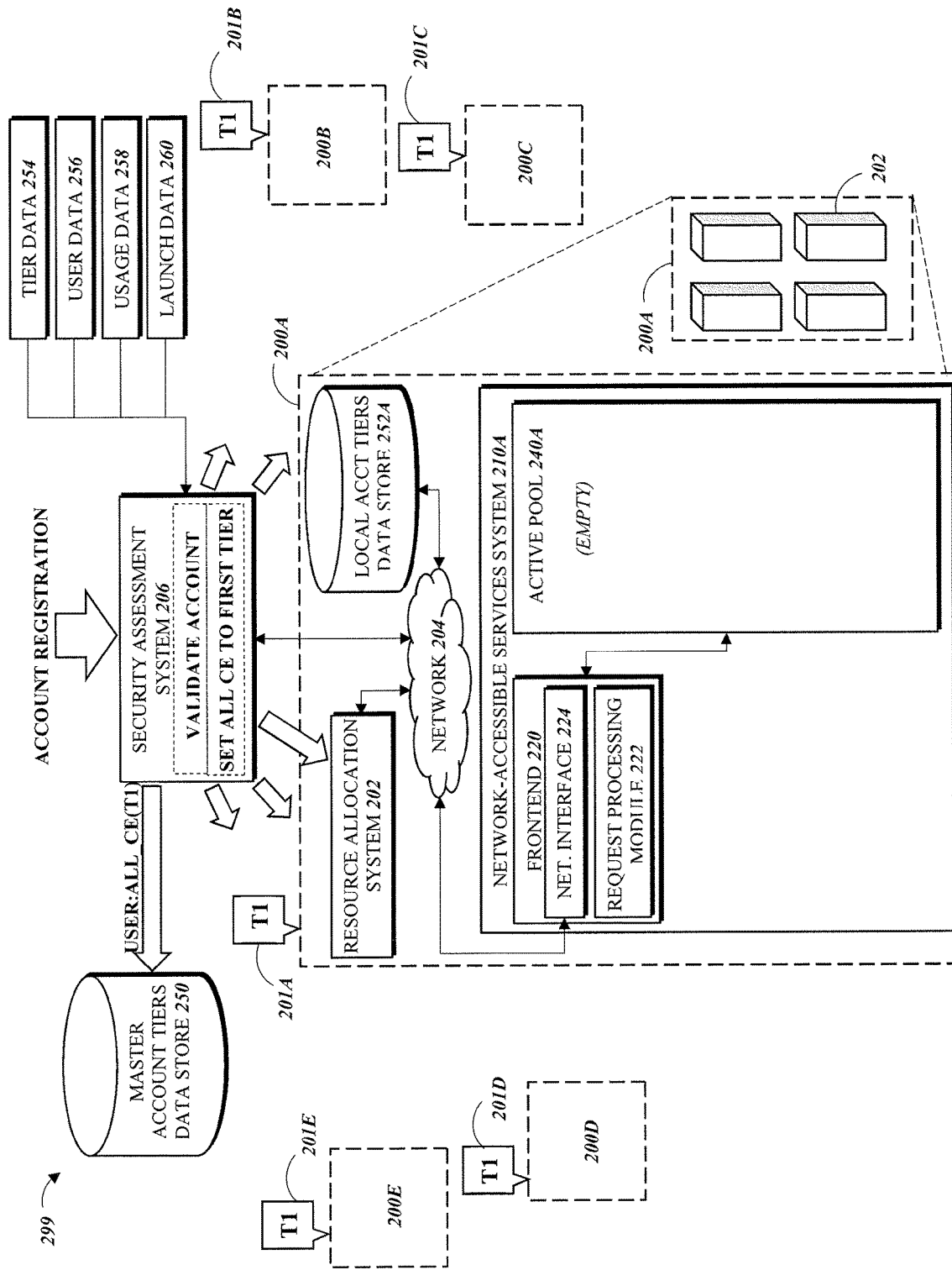
FIGS. 2A-E are procedural diagrams illustrating another example system for allocating resources based on tiered limits that change according to user account validation, in accordance with the present disclosure.
Figure 2B:
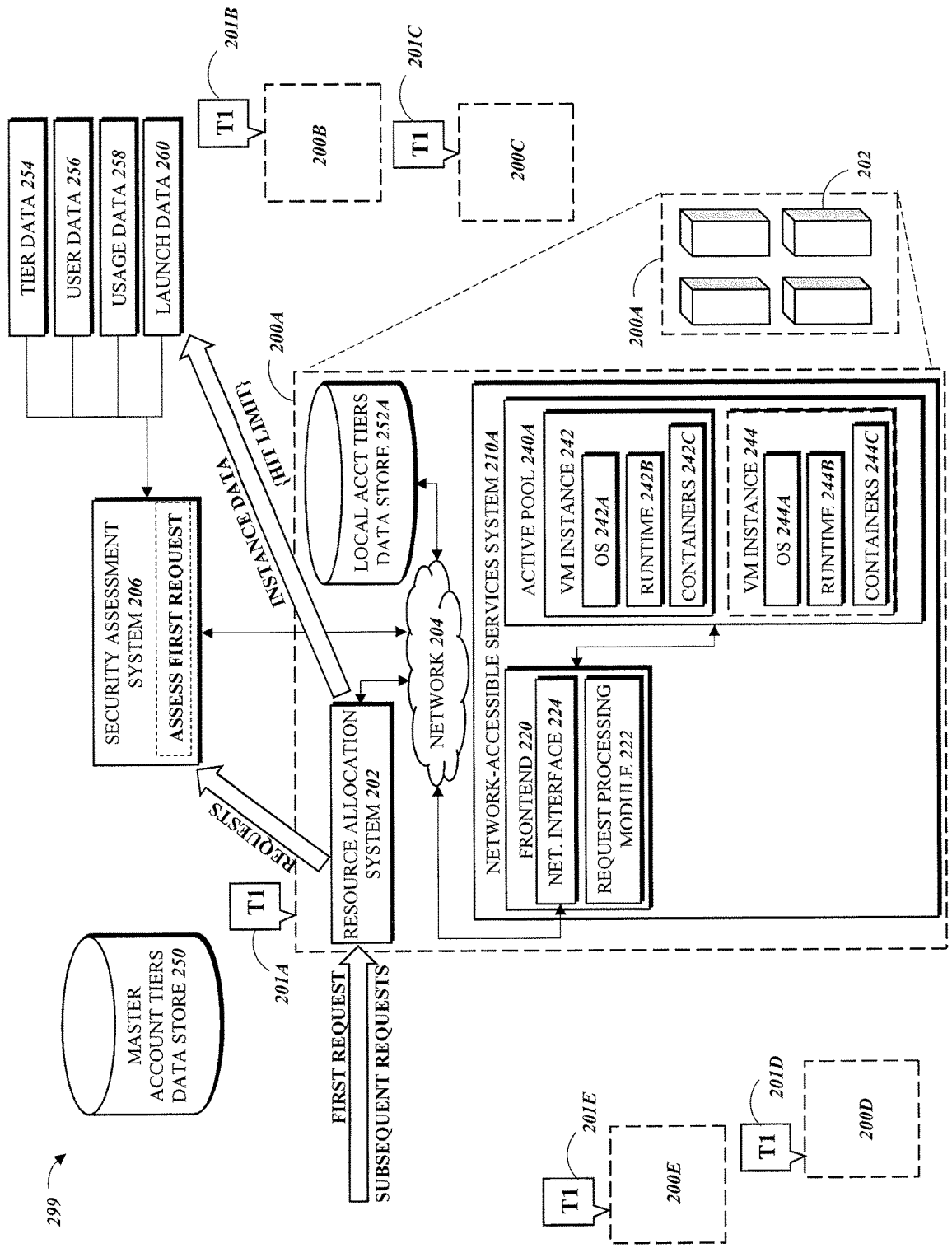

In the depicted example, the active pool 240A is empty in a first state represented in FIG. 2A, reflecting that the frontend 220 has not launched any virtual machine instances on behalf of the user; in a subsequent state (FIG. 2B) where user requests to launch virtual machine instances are being processed, instances 242, 244 are shown as having been launched, in response to launch requests, in the active pool 240A managed by the worker manager (the instance 244 is shown with a broken outline in FIG. 2B to indicate that the instance 244 would not be launched if the limit associated with the assigned tier T1 has been reached). Instances may have operating systems (OS) and/or language runtimes loaded thereon. For example, tin the active pool 204A, the instance 242 has an OS 242A, a runtime 242B, and containers 242C; the instance 244 has an OS 244A, a runtime 244B, and containers 244C. Containers are logical units created within a virtual machine instance using the resources available on that instance. In one embodiment, such containers are implemented as Linux containers. The virtual machine instances in the active pool 240A may have one or more containers created thereon and have one or more program codes associated with the user loaded thereon (e.g., either in one of the containers or in a local cache of the instance). Each container may have credential information made available therein, so that user codes executing on the container have access to whatever the corresponding credential information allows them to access.

The illustration of the various components within the network-accessible services system 210A is logical in nature and one or more of the components can be implemented by a single computing device or multiple computing devices. In some embodiments, the network-accessible services system 210A may comprise multiple frontends, multiple warming pool managers, and/or multiple worker managers. Although four virtual machine instances are shown in the example of FIG. 2B, the embodiments described herein are not limited as such, and one skilled in the art will appreciate that the network-accessible services system 210A may comprise any number of virtual machine instances implemented using any number of physical computing devices 202.

In accordance with the example system depicted in FIG. 1, FIGS. 2A-E illustrate several types of system data that can be received by or made available to the security assessment system 206 in order to manage launch requests under a multi-tier framework of virtual computing resource limits. Tier data 254 may include a tier data model (e.g., model 190 of FIG. 1) or its discrete components such as the multi-tier framework and instructions for applying the multi-tier framework, as well as additional information related to the tier data model. In some embodiments, tier data 254 may further include data structures identifying the assigned tiers for the computing environments 200A-E, such as when a single tier assignment for each computing environment applies globally to all users. User data 256 may include user account data, user profile information, user-submitted and/or derived user preferences, user-submitted configuration settings, results from previous security assessments related to the user or user account, and the like. User data 256 may further include indications of the assigned tiers for the computing environments 200A-E, such as when the tier assignments correspond specifically to the user or user account.

Usage data 258 may be any of the static or dynamic monitoring data described above, and may include usage information, which may be raw data or pre-analyzed data, pertaining to usage of the system by some or all other users. For example, the usage data 258 may include aggregate data describing the frequency at which the limits in certain tiers are being reached; if such a frequency is too high, the data may serve as an indication to the security assessment system 206 that the limits in that tier are set too low. Launch data 260 may include any information, such as virtual machine images, virtual machine instance templates, state data from prior instance executions, and parameter values and other information obtained from the request and/or previous similar launch requests, which can be used to refine or otherwise configure the launch of the requested virtual machine instance.

Generally as illustrated in FIGS. 2A-E, in some embodiments the security assessment system 206 may assign the computing environments 200A-E to tiers and then update (i.e., re-assign) the tiers in order to limit virtual machine instance usage by a particular user as follows. Referring to FIG. 2A, the present processes may be initiated when the security assessment system 206 receives an indication that a new user account has been registered with the computing resource service provider 299 in order to enable a user to request and launch virtual machine instances in the computing environments 200A-E (i.e., within the user's own network-accessible services systems). Upon detecting that the registration process is complete or has reached a predetermined stage, the security assessment system 206 performs one or more security assessments to determine the validity of the new user and/or new user account based on available user data, or sends user data associated with the new user account to another service that performs the security assessments.

Once the newly registered account is validated, the security assessment system 206 may assign all of the computing environments 200A-E that the user is able to access to a first tier T1, which may be the bottom tier (i.e., having the most restrictive limits) of the multi-tier framework. This establishes an initial "high-security" state for processing launch requests from the user: in some embodiments, the limit associated with the first tier T1 may be zero, or one, and may not vary greatly based on virtual machine type or initial confidence level of user validity (determined from a result of the first security assessment(s) performed by the security assessment system 250).

As a generalization of various examples described above, for each computing environment 200A-E the corresponding tier and/or the associated limit(s) of the tier may be recorded using a "tier tag" 201A-E, which may be a suitable data element stored in memory. For example, the tier tag 201A-E may be a variable-value pair stored in a configuration data record associated with the corresponding computing environment 200A-E. In some embodiments, "assigning" or "updating" a computing environment 200A to a particular tier T1 may comprise storing (e.g., by the security assessment system 206 or by the corresponding resource allocation system 202) the value corresponding to tier T1 in the tier tag 201A, and "determining" the tier of the computing environment 200A may comprise reading the value stored in the tier tag 201A. In some embodiments, such a configuration data record may be tier data 254 or user data 256 accessible by the security assessment system 206; in other embodiments, the configuration data record may be stored by a data storage service of the computing environment 200A-E; in still other embodiments, the configuration data record may be stored in the corresponding network-accessible services system itself. In the latter case, a network-accessible services system 210A may be considered "assigned" to the tier that corresponds to the stored value of the tier tag 201A.

FIG. 2B depicts a system state as the first request (i.e., subsequent to user account registration) from the user to launch a virtual machine instance is received by the resource allocation system 202 of a first computing environment 200A. To determine the appropriate computing environment 200A to receive the first instance request, the security assessment system 206 may determine that metadata associated with the first instance request identifies the first computing environment 200A as the target of the request. Alternatively, the data associated with the first instance may not identify a target computing environment 200A-E, and the security assessment system 206 may be configured to select the first computing environment 200A by default. The resource allocation system 202 may send this first instance request, in some embodiments accompanied by additional data, to the security assessment system 206. The security assessment system 206 may assess the information associated with the first instance request, in some embodiments together with the additional user data and/or with the results of previous assessments associated with the user, and may produce a new result (see FIG. 2C). In some embodiments, the security assessment system 206 may wait to further process the first instance request until it produces or receives the security assessment result; the resource allocation system 202 may proceed to deliver the first request to the frontend 220 of the network-accessible services system 210A. In some embodiments, the frontend 220 may process the request and launch the requested virtual machine instance even before the security assessment of the request is complete.

Correspondingly, the resource allocation system 202 may format the first instance request and subsequent instance requests for processing by the frontend 220 of the destination network-accessible services system 210A. The resource allocation system 202 may also modify the corresponding instance request to include some or all of available launch data 260, or may send some or all of the launch data 260 to the frontend 220 together with the launch request. On receipt of an instance request, the request processing module 222 may read the value stored in the tier tag 201A or may otherwise determine the tier T1 and the limit associated with the network-accessible services system 210A. In the example where the T1 limit number of virtual machine instances is one, the request processing module 222 will, in response to the first instance request, be able to launch the virtual machine instance 242 in the active pool 240A, which was previously empty (see FIG. 2A). The frontend 220 and/or the resource allocation system 202 may also generate usage data 258 and/or launch data 260 based on the executing virtual machine instance 242. However, a subsequent instance request would not cause the request processing module 222 to launch a second virtual machine instance 244 because the limit has been reached; instead, the frontend 220 may send a "hit limit" error message to the user and/or to one or more data stores (e.g., to be stored as usage data 258 or launch data 260).

Figure 2C:
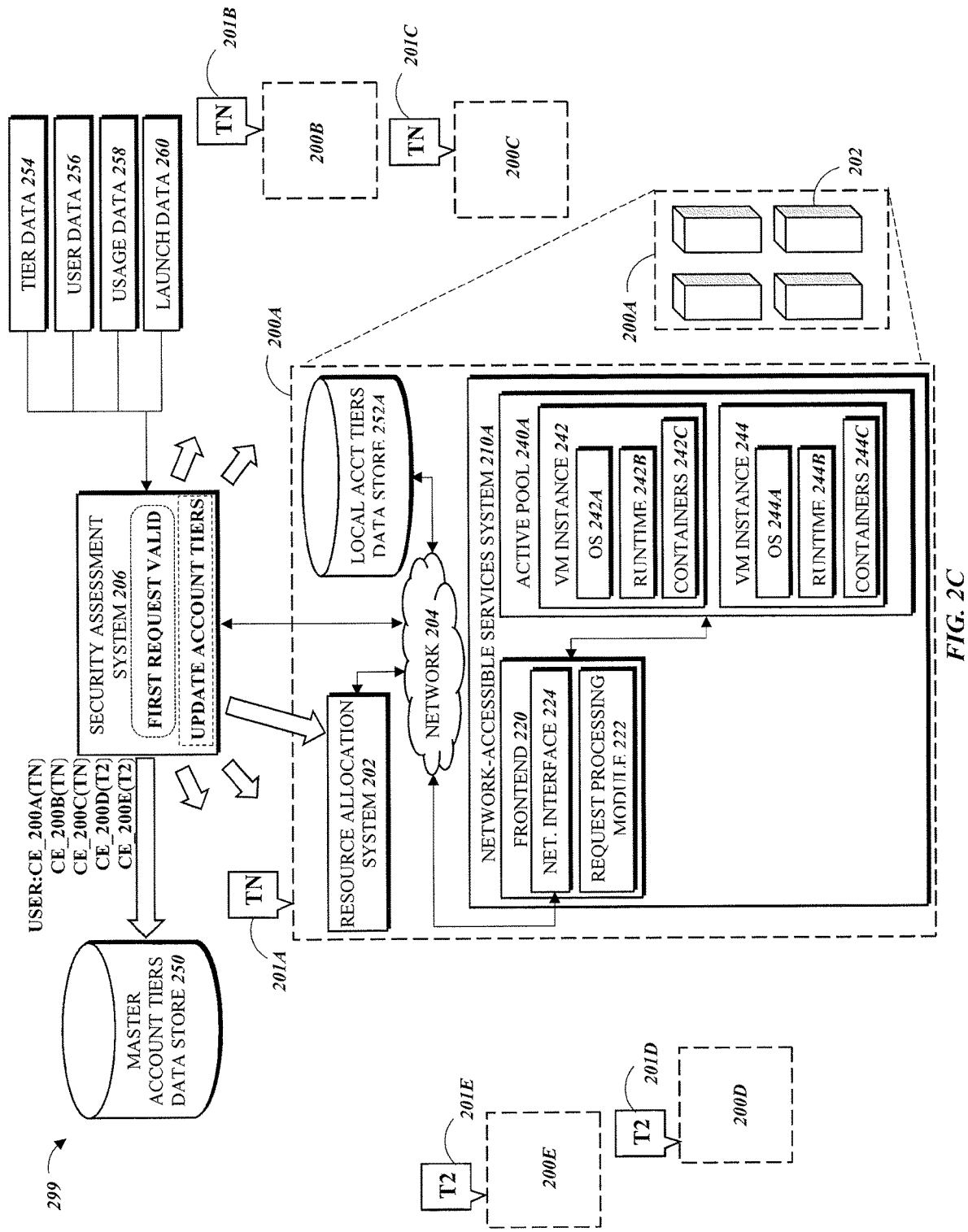

FIG. 2C depicts a system state in which the security assessment system 206 is responsive to receiving a positive result (e.g., a user metric for validity that exceeds a certain threshold) from the security assessment system's 206 assessment of the first instance request. The security assessment system 206 finishes the security assessment of the first request with a favorable result indicating that the first request is likely valid. The security assessment system 206 then updates the tiers of all of the computing environments 200A-E according to the tier data model instructions (i.e., in the tier data 254). The instructions may cause the resource allocation system to incorporate other elements of the tier data 254, as well as elements of user data 256 (e.g., user-specified configuration settings) and/or usage data 258 (e.g., comparative traffic statistics for the computing environments 200A-E), to determine the new tiers. In one embodiment, the security assessment system 206 is configured to move the computing environments 200A-E to new tiers as follows: the target/default computing environment 200A is moved to the highest (i.e., most permissive) tier TN; two other computing environments 200B, 200C are identified as "high-use" computing environments that the validated user is likely to expand into, and are also moved to the highest tier TN; and, all other computing environments 200D, 200E are moved to an intermediate tier T2 wherein the limit(s) is/are higher than or equal to the limits in the first tier T1, and lower than or equal to the limits in the highest tier TN. The security assessment system 206 may also push updates of the tiers, in each computing environment 200A-E, associated with the user to the master account tiers data store 250 (as indicated by pseudocode).

Figure 2D:
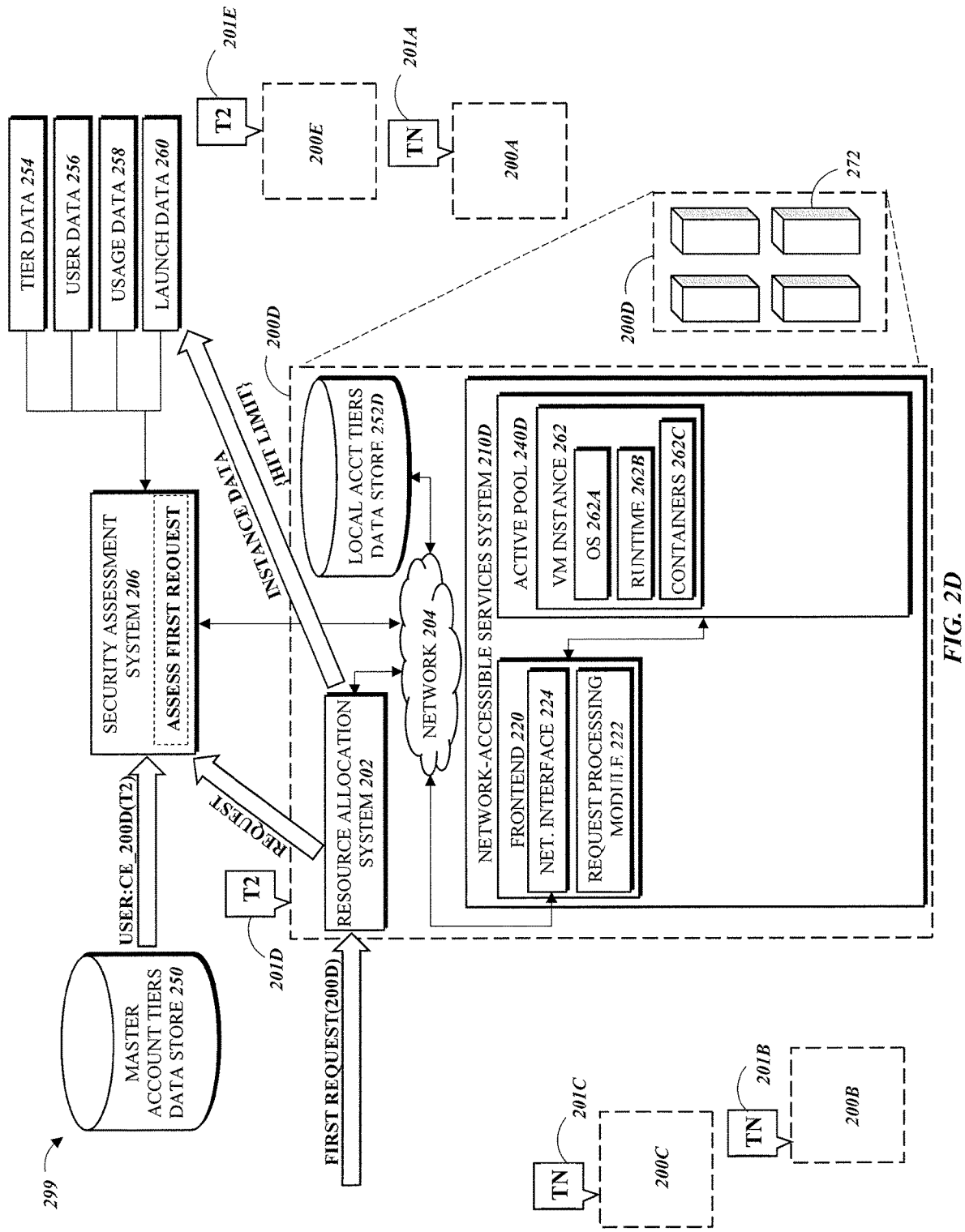

FIG. 2D depicts a system state occurring after the tiers are updated as in FIG. 2C, wherein the resource allocation system 202 of another computing environment 200D receives a new instance request for a virtual machine instance in the computing environment 200D, which is assigned to an intermediate tier T2. The resource allocation system 202 again sends the new instance request and other needed data for assessment by the security assessment system 206 as in FIG. 2B. Also as in FIG. 2B, the resource allocation system 202 modifies, formats, and sends the new instance request to the frontend 220 of the network-accessible services system 210D implemented on hardware computing devices (i.e., servers 272) in the target computing environment 200D. The corresponding request processing module 222 may determine whether the T2 limit number of virtual machine instances are executing in the active pool 240D; if not, the request processing module 222 may launch a new virtual machine instance 262 (having an OS 262A, runtime 262B, and containers 262C as described above) in the active pool 240D. If the limit is reached, the frontend 220 may send the "hit limit" error to the resource allocation system 202, which in turn may store the error information as usage data 258 and/or launch data 260.

Figure 2E:
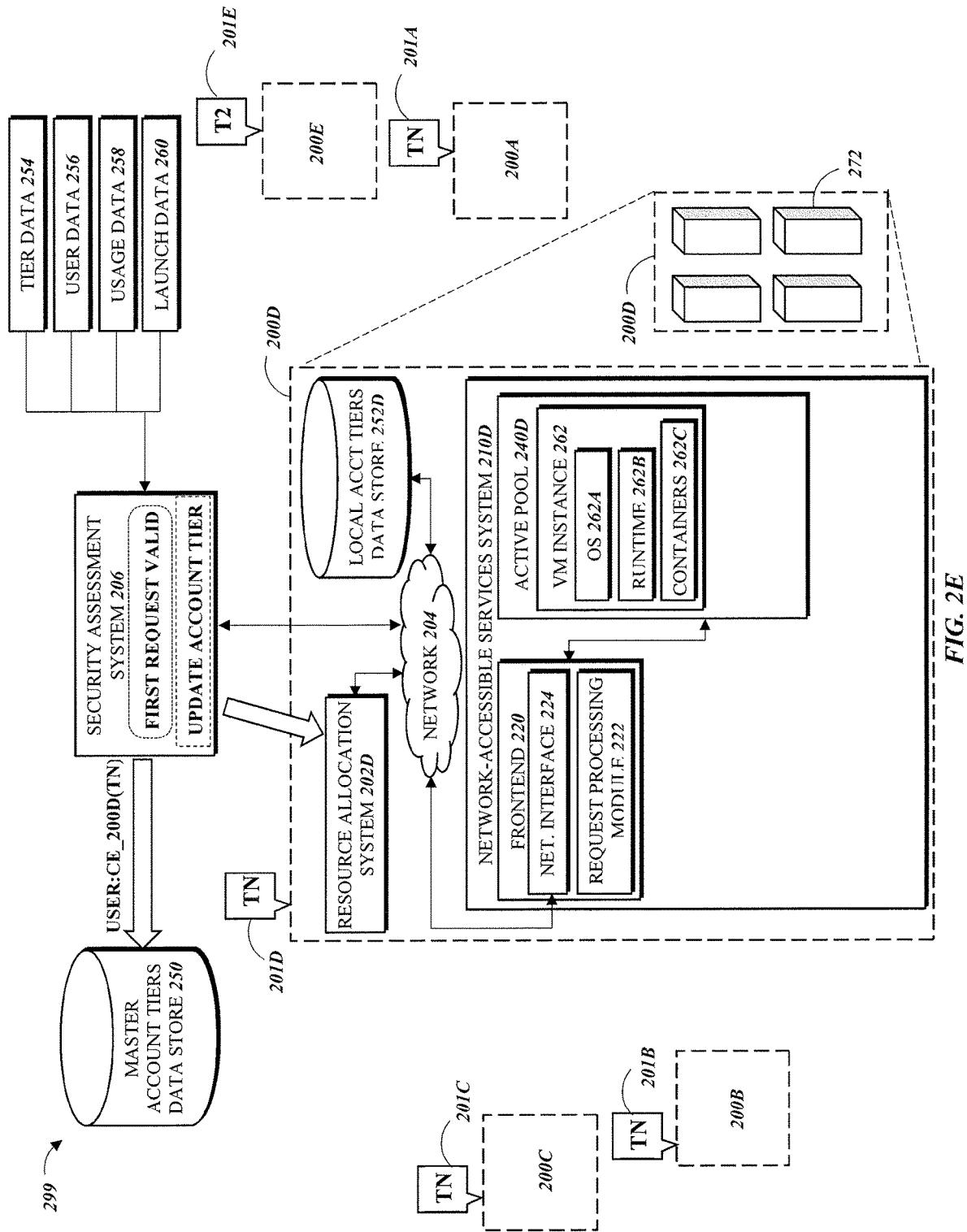

Similar to the state depicted in FIG. 2C, FIG. 2E illustrates a state in which the security assessments initiated in FIG. 2D return a good result, indicating the request to launch a virtual machine instance in the intermediate-tiered computing environment 200D is likely valid. The security assessment system 206 accordingly moves the computing environment 200D to the highest tier TN. In other states of this process, if the security assessments (e.g., those initiated in FIGS. 2B and 2D) return a bad result, the security assessment system 206 may identify the corresponding request as potentially malicious activity, and/or may identify the corresponding user or user account as potentially malicious or not valid. The requests and other activity associated with the corresponding user/account may be restricted, suspended, terminated, or otherwise handled as disallowed or heavily restricted usage of the system. The security assessment system 206 may cause an automated or manual account review, which may confirm the maliciousness of the activity or determine that the activity was improperly flagged; such determinations may generate feedback data that may be incorporated into the user data 256 or usage data 258 of the system.

Figure 3:
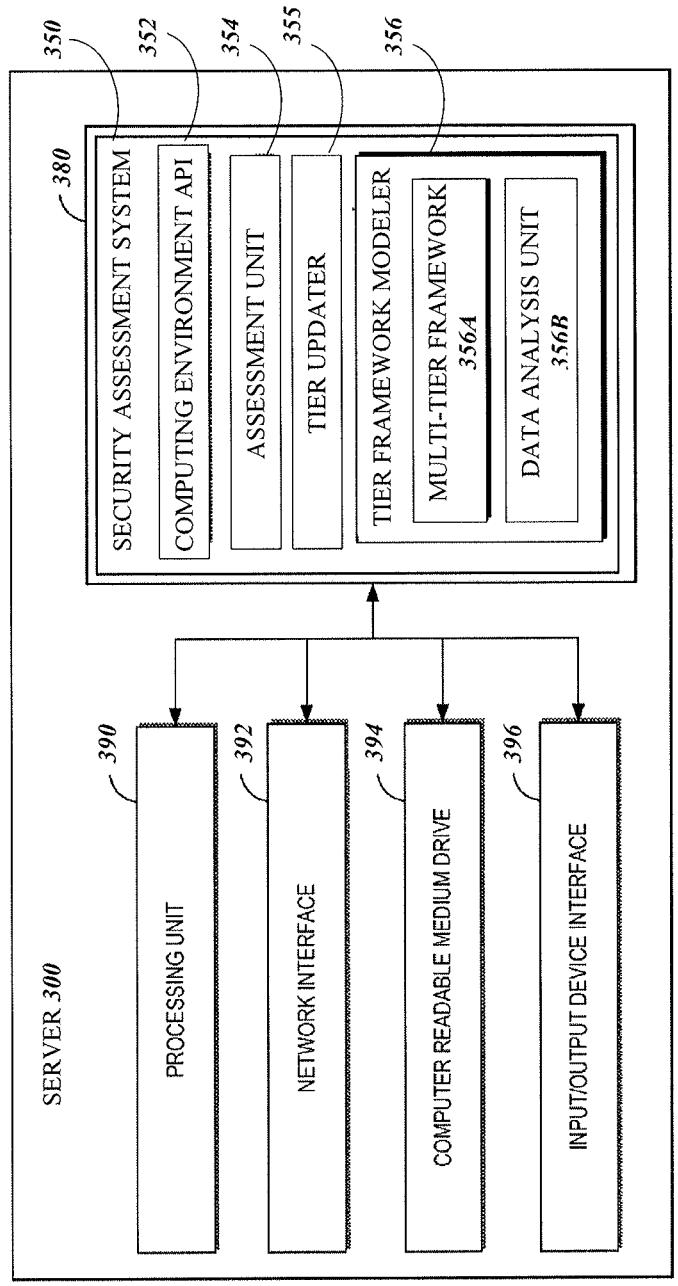
FIG. 3 is a block diagram of an example computing device architecture providing a resource allocation system that cooperates with virtual resource manager services in computing environments.

FIG. 3 depicts a general architecture of a computing system (referenced as server 300) that processes requests to allocate virtual computing resources to a user in a computing environment as described above. The general architecture of the server 300 includes an arrangement of computer hardware and software modules that may be used to implement aspects of the present disclosure. The hardware modules may be implemented with physical electronic devices, as discussed in greater detail below. The server 300 may include many more (or fewer) elements than those shown in FIG. 3. It is not necessary, however, that all of these generally conventional elements be shown in order to provide an enabling disclosure. Additionally, the general architecture illustrated in FIG. 3 may be used to implement one or more of the other components illustrated in FIGS. 1 and 2A-E, including the frontend and/or the security assessment system which may be implemented in the same or a separate architecture from the frontend and/or the resource allocation system.

As illustrated, the server 300 includes a processing unit 390, a network interface 392, a computer readable medium drive 394, an input/output device interface 396, all of which may communicate with one another by way of a communication bus. The network interface 392 may provide connectivity to one or more networks or computing systems. The processing unit 390 may thus receive information and instructions from other computing systems or services via a communication network. The processing unit 390 may also communicate to and from memory 380 and further provide output information for an optional display (not shown) via the input/output device interface 396. The input/output device interface 396 may also accept input from an optional input device (not shown).

The memory 380 may contain computer program instructions (grouped as modules in some embodiments) that the processing unit 390 executes in order to implement one or more aspects of the present disclosure. The memory 380 generally includes RAM, ROM and/or other persistent, auxiliary or non-transitory computer-readable media. The memory 380 may include computer program instructions and other information for implementing aspects of the present disclosure. For example, in one embodiment, the memory 380 implements a security assessment system 350 as described above. The security assessment system 350 may include a computing environment API 352 that may be executed by the processing unit 390 to enable the security assessment system 350 to access and otherwise communicate with communicatively isolated computing environments (e.g., with the resource allocation systems described above). In addition, the memory 380 may include and/or communicate with one or more data repositories (not shown), for example, to access tier data, user data, and the like. The memory 380 may also include an assessment unit 354 containing instructions that the processing unit 390 executes to perform security assessments of user data, request data, etc., as described above. A tier updater 355 contains instructions that the processing unit 390 executes to obtain the tier data model and current tier information pertinent to the user, and to determine tier and/or limit updates and push the updates to the computing environments. A tier framework modeler 356 includes the multi-tier framework 356A, stored in memory 380, and program instructions for incorporating new data (e.g., usage data) into the multi-tier framework 356A using the data analysis unit 356B.

Figure 4A:
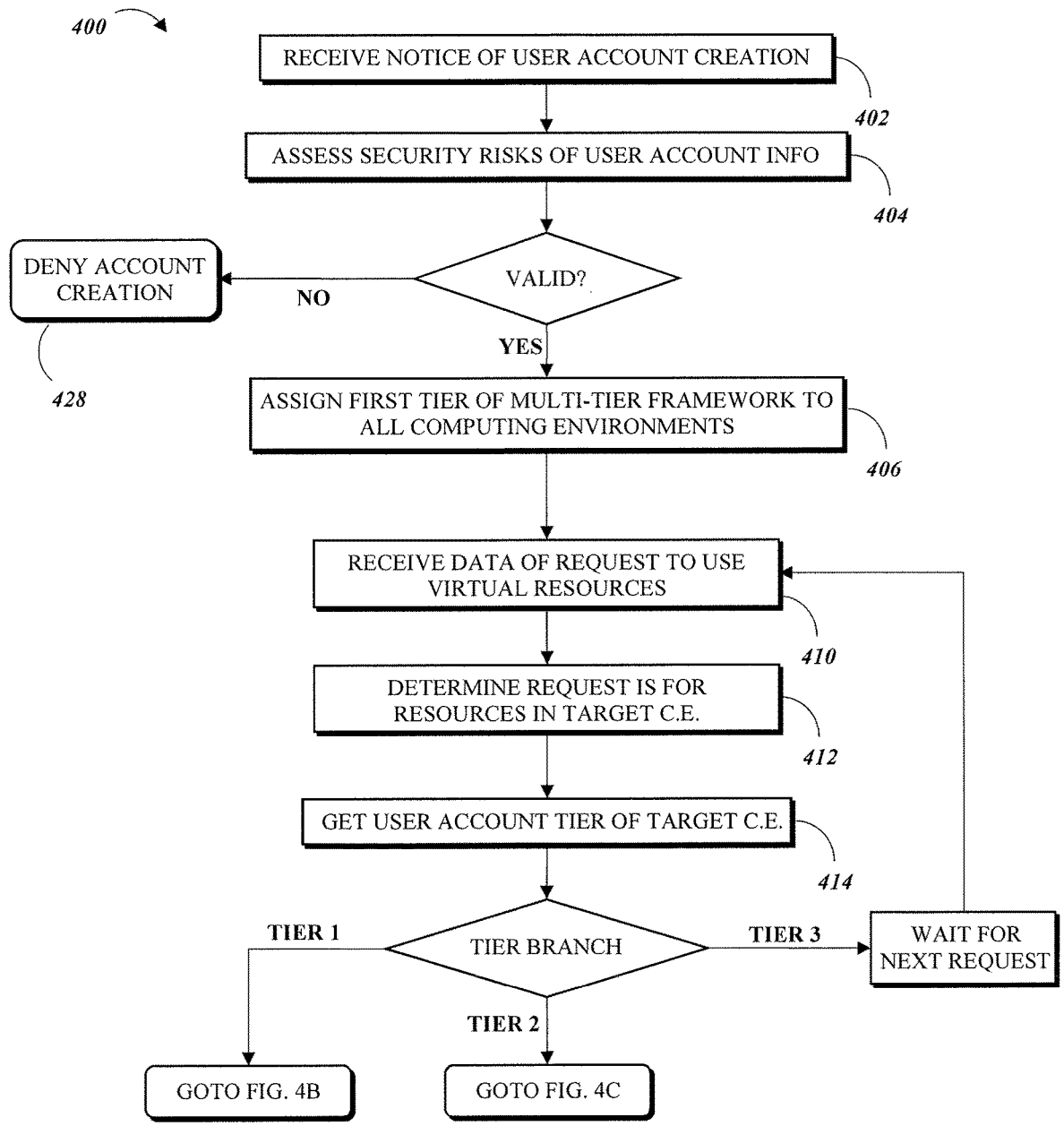
FIG. 4A is a flow diagram of an example method for processing a request to use virtual computing resources based on a multi-tier framework of limits.
Figure 4B:
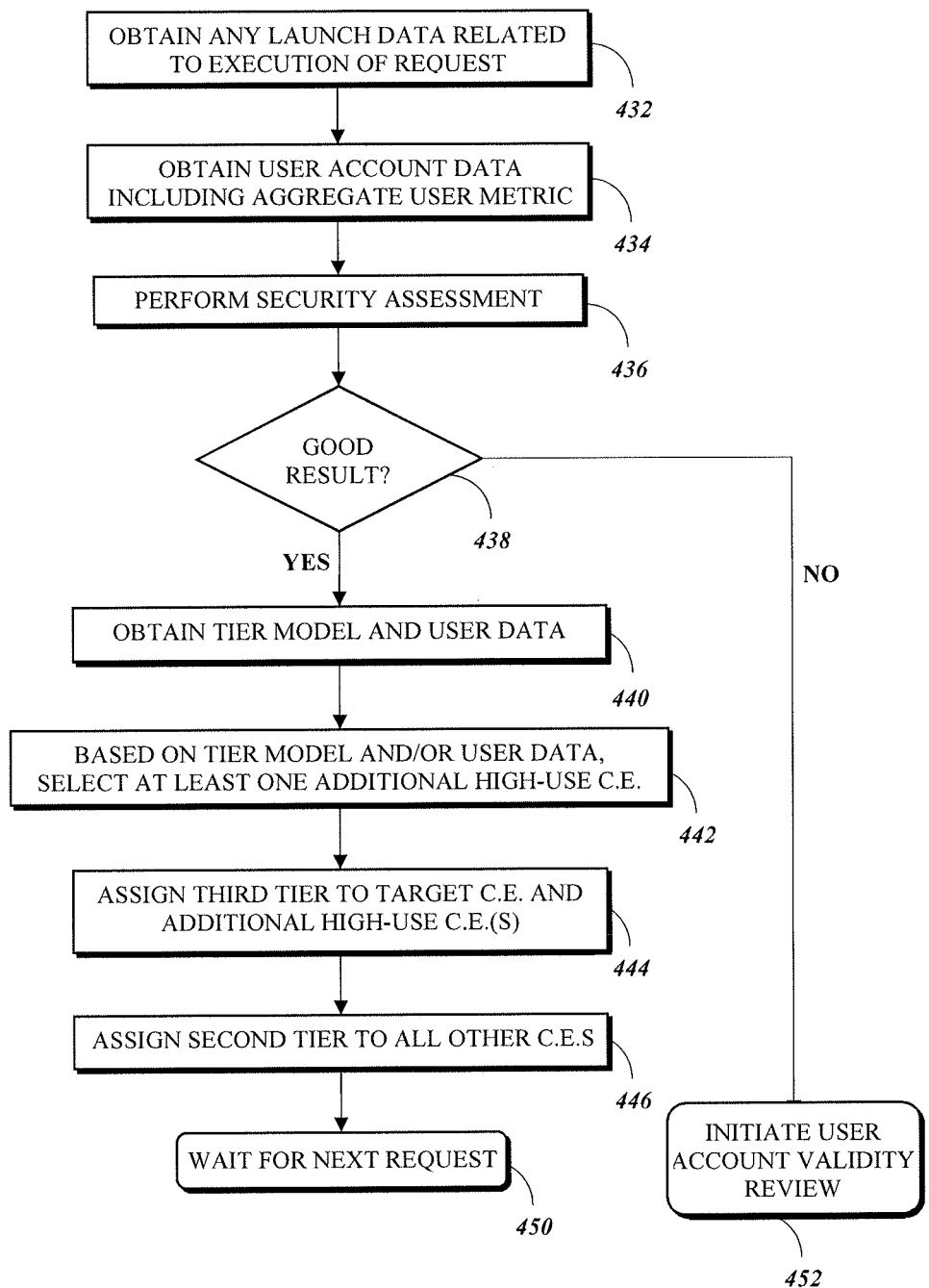
FIGS. 4B-C are flow diagrams of example methods for updating tiers of computing environments.
Figure 4C:
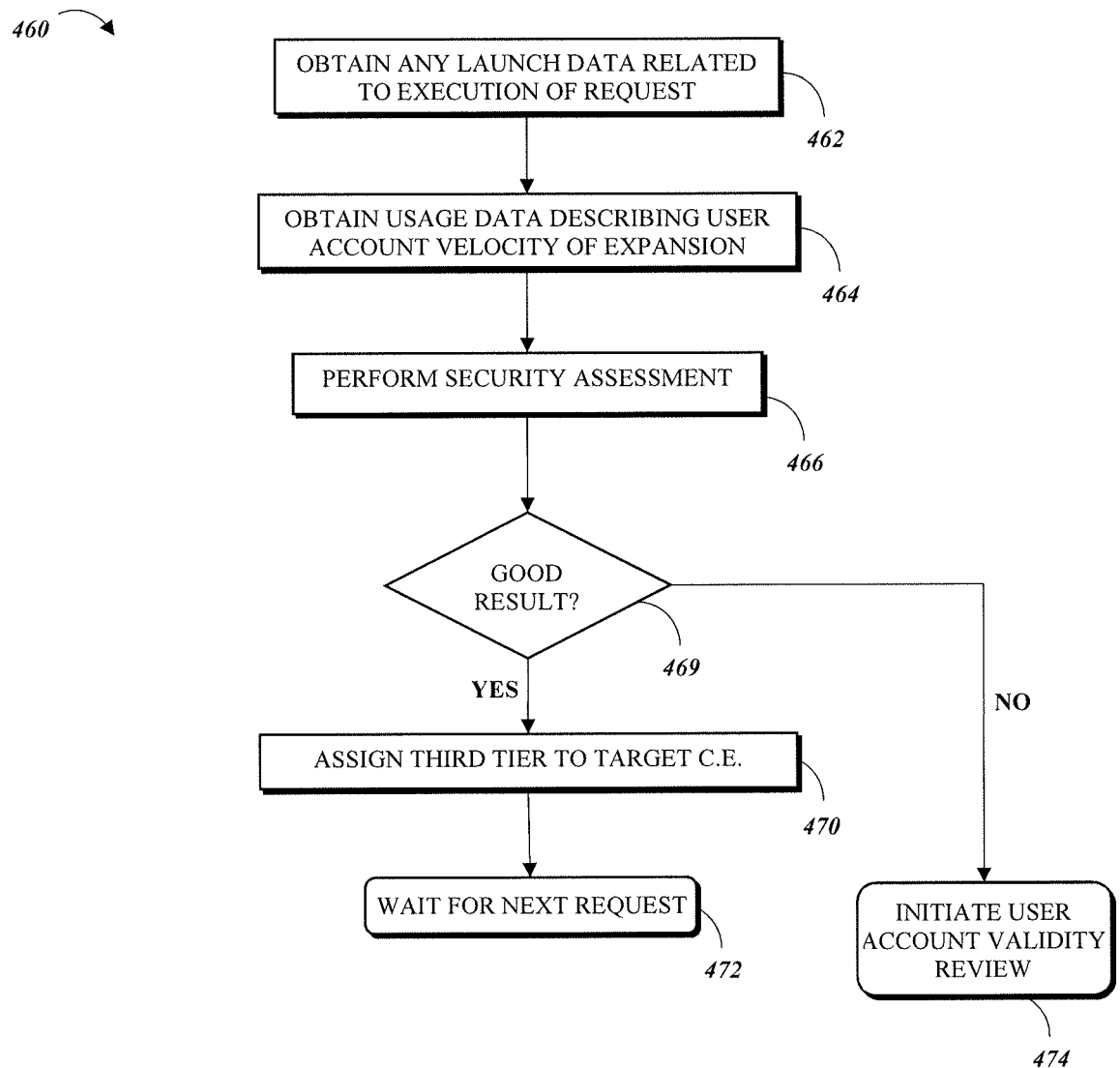

Turning now to FIGS. 4A-C, methods 400, 430, 460 implemented by the components of the security assessment system perform the resource request processing and tiered limits management described above with respect to FIGS. 2A-E. At block 402, the system receives a notice that a user account has been created or registered for use with virtual computing resource allocations. At step 404, the system initiates an assessment of the security risks associated with the new user account. For example, the system obtains the user account information from a user data store and initiates the initial security assessment of the user/user account, and a user metric representing the result of the security assessment is generated and stored. If the initial security assessment indicates that the user and user account are not valid, at step 428 the system may deny creation or registration of the new account. If the user and user account are valid, the system proceeds.

At step 406, the system assigns all of the computing environments in which the user can request virtual computing resources to the first tier of a multi-tier framework of resource allocation limits. For example, the system may access system memory or a data store to obtain the multi-tier framework, and may determine an identifier of the first (i.e., bottom) tier. The system may then cause a resource allocation system in each of the computing environments to store the identifier. In another example, the system may further obtain the limit associated with the bottom tier and may cause the resource allocation systems to store the limit. In another example, the system may access preferences from an administrator of the user account that specified how to tier the various computing environments. This option, for example, may be made available to the administrator during account creation time or after account creation. The preferences may be stored as user data that the system can be configured to retrieve (e.g., using the instructions associated with the multi-tier framework in the tier data model); additionally or alternatively, the system (e.g., the tier modeler described above) may incorporate the administrator-supplied preferences into the instructions of the tier data model, so that the system obtains information identifying the appropriate tier and/or limit(s) according to the preferences.

Subsequent to the assignments to the first tier (step 406), at step 410 the system may receive, from one of the resource allocation systems, a request (or data describing the request) to allocate one or more instances for use by the user associated with the new user account. In another embodiment, the user may enter the data forming the request into a user interface, and the system may receive the request from the user interface. At step 412, the system may determine that the request identifies a first computing environment as the target computing environment in which the allocation of computing resources is desired. In one embodiments, the system may read an identifier for the target computing environment from the request. In another embodiment, there may be no identifier of a computing environment in the request, and the system may use a default selection for the target computing environment. The system may then, at step 414, determine the assigned tier, associated with the user, of the target computing environment. For example, the system may read the tier identifier from a tier tag stored in memory, or may query the computing environment to provide the tier identifier.

Further processing depends on the tier identified at step 414. The illustrated example uses a three-tier framework; the first/bottom tier processing is described in FIG. 4B, and the second/intermediate tier processing is described in FIG. 4C. If the request was delivered to a computing environment that is already in the third/top tier, the system can simply wait for the next request to be received (i.e., return to step 410).

FIG. 4B illustrates a method 430 for updating the tiers when the tier data model requires 1) all computing environments to be initially assigned to the first tier, and 2) all computing environment tiers to be updated in response to processing the first-received request for resources after the user account was created/registered. Thus, in determining (i.e., at step 414 of FIG. 4A) that the target computing environment is assigned to the first tier, it can be assumed that the received request being processed is the first-received request. At step 432, the system may obtain (e.g., from a usage data store or another data store) any launch data that is related to the first-received request. At step 434, the system may send any relevant user data that could be used to perform a security assessment, such as the stored aggregate user metric described herein. At step 436, the system may perform the security assessment to determine the validity of the associated activity, as described above, and may receive the result(s) of the security assessment(s); at step 438 the system may determine whether the received results are "good" results indicating a suitable level of confidence that the user, user account, and request are all valid. For example, the system may compare the received result to a threshold acceptable result. If the result is not good, at step 452 the system may initiate a user account validity review.

If the results of the security assessments are good, the tier assignments should be updated. At step 440, the system may obtain the data needed to determine the new tier assignments of the various computing environments. For example, the system may retrieve the tier data model from memory in order to apply the model's instructions for determining the correct tiers, and to obtain the tiers and/or limits from the multi-tier framework. Additionally, the system may retrieve relevant user data, such as user preferences or user-submitted configuration settings, which further influences the selection of new tiers. For example, the configuration settings may identify computing environments that the user wants to use (i.e., whitelisted or preferred) and/or computing environments that the user will not use (i.e. blacklisted). In another example, the configuration settings may identify desired or approved modifications to the applicable limits. The collected data may additionally include usage data describing various segments and aspects of virtual computing resource usage.

At step 442, based on the data collected at step 440, the system may identify one or more high-use computing environments in addition to the target computing environment. The high-use computing environment(s) may be selected by system default, or by specification in user account settings, or by data analysis that indicates the selected computing environments are likely to be used by the user. At step 444, the system may assign the target computing environment and the high-use computing environment(s) to the third tier, and at step 446 the system may assign all other computing environments to the second tier. The system then waits to receive the next request (step 450).

FIG. 4C illustrates a method 460 for processing a user's request for compute resources in a computing environment that is assigned to the second/intermediate tier. At step 462, the system obtains launch data related to the request and/or the requested compute resource, as in step 432 of FIG. 4B. At step 464, the system obtains, by collecting or by retrieving from a user data store, usage data that describes a velocity of expansion of the user's requests for virtual computing resources. The velocity of expansion may be determined by, for example, monitoring over a certain time period the frequency of requests from the user that target one, some, or all of the computing environments assigned to the second tier. Such velocity data can then be compared to a threshold velocity (or similar usage pattern) that is associated with typical legitimate expansion into the computing environment(s) at issue. In one embodiment, at step 466 the system performs the security assessment based on the request, the launch data obtained at step 462, and the usage data obtained at step 464; the security assessment may include deriving the velocity data and making the comparison of the velocity data to a threshold acceptable velocity.

The system receives the result of the security assessment and determines, at step 469, whether the result is a good result. If not (i.e., the velocity of expansion indicates potentially malicious activity), at step 474 the system may initiate a user account validity review. If the result is good, at step 470 the system may move the target computing environment to the third tier and the may wait for the next request (step 472).

Figure 5:
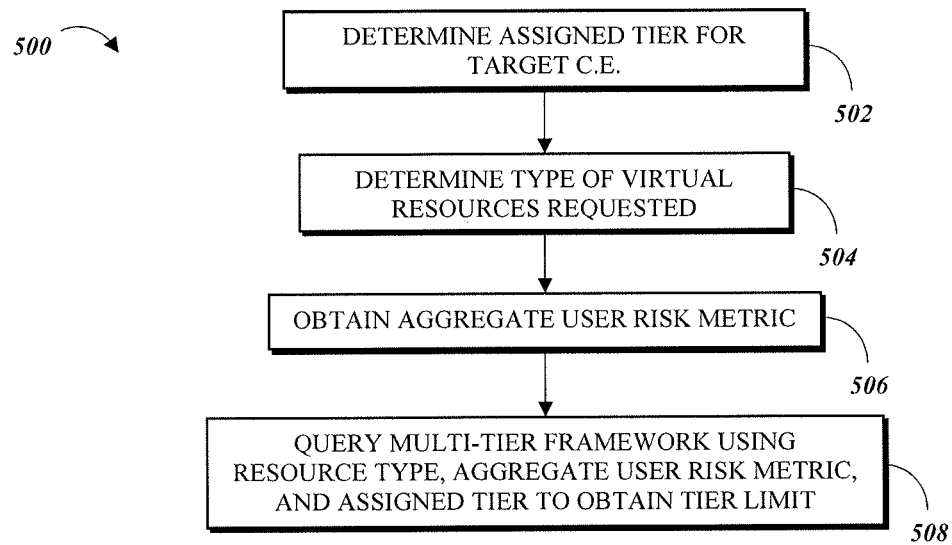
FIG. 5 is a flow diagram of an example method for determining a tier limit associated with a computing environment and a request.

FIG. 5 illustrates an example method 500 for determining the applicable tier limit when the multi-tier framework 550 associates multiple limits to each tier based on one or more additional variables. The additional variables may derive from any of the data used to process the requests; in the illustrated embodiment, the additional variables derive from user data and from data in the request. More specifically, the relevant user data is the value of the user metric that describes the level of confidence in the validity of the user/activity, and the relevant data in the request is the identification of a type of virtual computing resource being requested. Thus, the framework 550 includes a set of nine limits for each of a sequential set of ranges of the user metric value; the set of limits includes first, second, and third tier limits for each of three different resource types.

At step 502, the system may determine the tier of the target computing environment, as in step 414 of FIG. 4A. At step 504, the system may determine the type of virtual computing resource being requested. For example, the system may identify the type from metadata associated with the request. At step 506, the system may obtain the value of the user metric associated with the user account, such as by querying the user data store to retrieve the user metric. Then, at step 508, using the user metric score, the identified virtual computing resource type, and the identified assigned tier, the system may determine the applicable tier limit from the framework 550.

Figure 6:
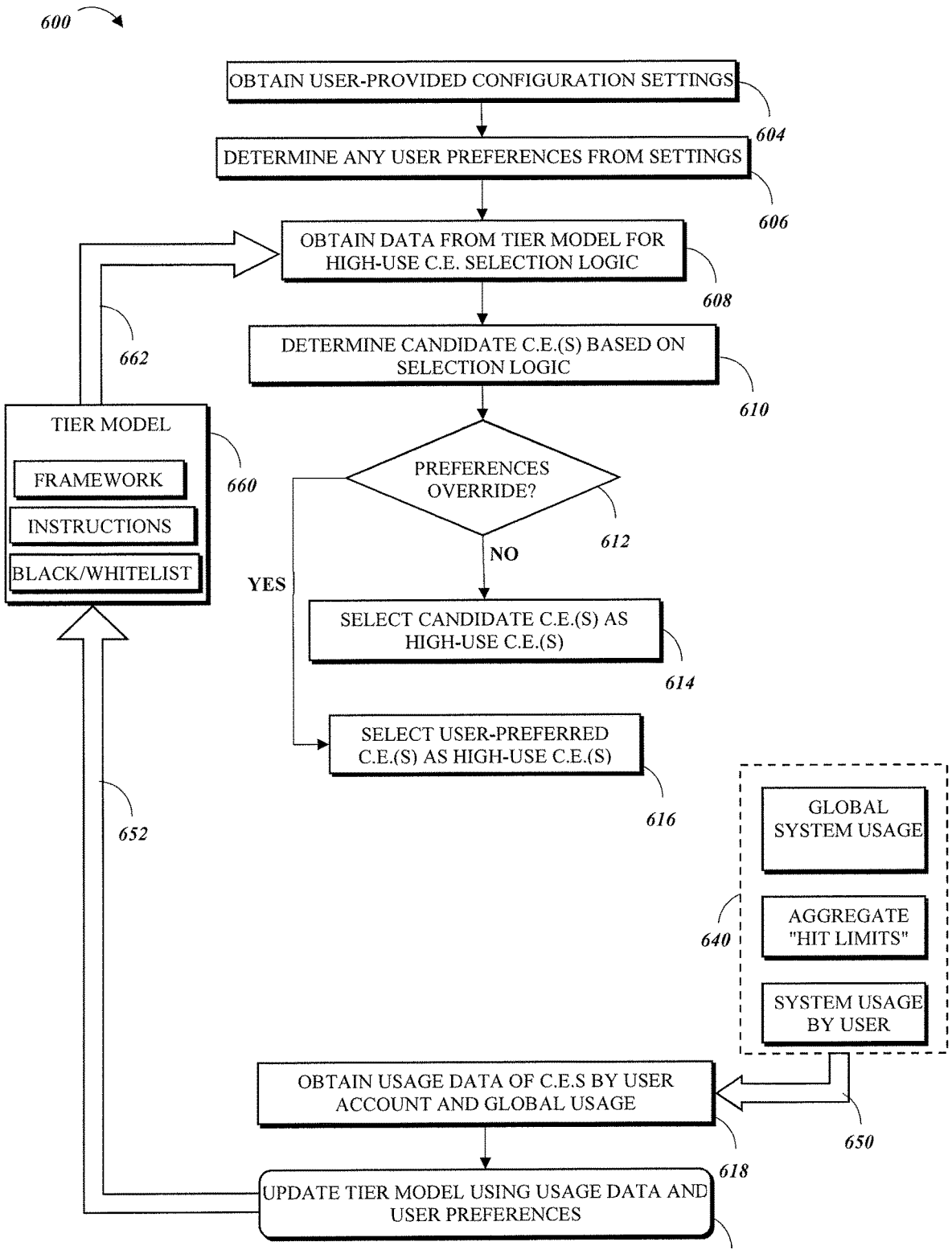
FIG. 6 is a flow diagram of an example method for identifying high-use computing environments based on a tier model, and updating the tier model.

FIG. 6 depicts a method 600 implemented by the components of the resource allocation system, described above, to identify the high-use computing environments as in steps 440 and 442 of FIG. 4B, and also to develop and continually refine a tier data model 660 that can provide an optimal framework for assigning tiers and optimal limits that protect the computing environments from malicious activity without overly restricting legitimate use. At step 604, the system may obtain any user-provided configuration settings by, for example, querying the user data store. At step 606, the system may determine whether any of the configuration settings identify user preferences regarding the selection of high-use computing environments. At step 608, the system may retrieve, from the tier data model 660, model data 662 (e.g., the instructions) that embodies selection logic for identifying the high-use computing environments.

At step 610, the system may use the selection logic to identify candidate computing environments. At step 612, the system may determine whether any of the user preferences override the selection of the candidate computing environments as high-use computing environments. If not, at step 614 the system may select the candidate computing environments as the high-use computing environments. If the preferences do override, at step 616 the system may select the user-preferred computing environments as the high-use computing environments.

Meanwhile, the system and cooperating services, such as network traffic monitoring services, may monitor global system usage 640 of the computing environments. The system and/or cooperating services may analyze the global system usage to produce usage data 650, which the system obtains at step 618. At step 620, the system updates the tier data model 660 by sending a data package 652 containing the usage data and any other parameters, such as the results of the selection logic processing, for incorporation into the deployment model 660.

In one aspect, the present disclosure provides a system that includes a first electronic data store storing tier data that includes: a first record including a first tier of limits, a second tier of limits that is less restrictive than the first tier of limits, and a third tier of limits that is less restrictive than the second tier; and, selection logic for identifying one or more candidate high-use computing environments based on one or more input parameters. The system further includes one or more hardware computing devices including specific computer-executable instructions that upon execution cause the system to: receive a notification that a user account has been registered with a computing resource service provider that provides a plurality of computing environments communicatively isolated from each other, the notification including user account information; cause concurrent execution, within each of the plurality of computing environments, of virtual machine instances associated with the user account to be limited according to the first tier of limits; receive first request data describing a first request to launch a first virtual machine instance within a first computing environment of the plurality of computing environments, the first request associated with the user account; identify, using at least the selection logic, one or more high-use computing environments of the plurality of computing environments; and, cause limits on the concurrent execution, within the plurality of computing environments, of virtual machine instances associated with the user account to be updated, the concurrent execution within the first computing environment and the one or more high-use computing environments being limited according to the third tier of limits, and the concurrent execution within each other computing environment of the plurality of computing environments being limited according to the second tier of limits.

The specific computer-executable instructions upon execution may further cause the system to: receive second request data describing a second request to launch a second virtual machine instance in a second computing environment in which the concurrent execution of virtual machine instances is limited according to the second tier of limits; cause usage data to be generated, the usage data describing activity associated with the user account within the plurality of computing environments and including a rate at which a plurality of launch requests associated with the user account were received by the system, the plurality of launch requests each identifying a corresponding computing environment, of the plurality of computing environments, in which the concurrent execution is limited according to the second tier of limits, the plurality of launch requests including the second request; determine that the rate is at or below a threshold rate indicating potential malicious activity; and, cause the concurrent execution within the second computing environment to be limited according to the third tier of limits.

The first record may be associated with a first type of a plurality of instance types; the first tier of limits may be associated in the first record with a first range of values of a user metric describing a level of confidence that activity associated with the user account is not malicious; the second tier of limits may be associated in the first record with a second range of values of the user metric, the values of the second range being greater than the values of the first range; and, the third tier of limits may be associated in the first record with a third range of values of the user metric, the values of the third range being greater than the values of the second range. The specific computer-executable instructions upon execution may further cause the system to: receive a current value of the user metric; determine that the current value is within the first range of values; and, determine that the first request is for a first virtual machine instance of the first instance type.

The specific computer-executable instructions upon execution may further cause the system to: receive usage data describing activity associated with the user account within the plurality of computing environments and including a frequency at which error messages are generated, the error messages indicating that processing a received request would cause, within a receiving computing environment associated with the received request, the second tier of limits to be exceeded; determine that the frequency exceeds a predetermined acceptable error message frequency; and modify, within the first record, the second tier of limits to be less restrictive. To identify a second computing environment of the plurality of computing environments as one or of one or more high-use computing environments, the specific computer-executable instructions upon execution may further cause the system to evaluate the selection logic using, as the one or more input parameters, information associated with the first computing environment, information associated with the second computing environment, and at least part of the user account information, to determine that the second computing environment has one or both of a geographic proximity to the first computing environment, and a greater global usage rate than the first computing environment, the global usage rate measuring usage of a given computing environment by all registered users of the computing resource service provider.

In another aspect, the present disclosure provides a system including a processor and memory storing specific computer-executable instructions that, when executed by the processor, cause the system to: receive first request data describing a first request to use virtual computing resources in one of a plurality of computing environments; determine, based on the first request data, that the first request is associated with a user identifier; determine that each of the plurality of computing environments limits use, associated with the user identifier, of virtual computing resources according to a first tier of a multi-tier framework of limits; receive a first result of a first security assessment of a user associated with the user identifier; determine that the first result validates the user to a first computing environment of the plurality of computing environments; cause each computing environment in a first subset of the plurality of computing environments to limit the use, associated with the user identifier, of virtual computing resources according to a third tier of the multi-tier framework, the first subset including the first computing environment and one or more additional computing environments; and, cause each computing environment in a second subset of the plurality of computing environments to limit the use, associated with the user identifier, of virtual computing resources according to a second tier of the multi-tier framework, the second subset including one or more of the computing environments not included in the first subset.

The user identifier may identify a user account; the first request may be the first request associated with the user account that is received by the system subsequent to a registration of the user account to use virtual computing resources in the plurality of computing environments, and the first security assessment may be based on the user account and the first request data. The second tier may be less limiting than the first tier, and the third tier may be less limiting than the second tier, on the use associated with the user identifier. The second subset may include each computing environment, of the plurality of computing environments, that is not included in the first subset. The first request may be to use virtual computing resources in the first computing environment, and the computer-executable instructions, when executed by the processor, may further cause the system to: receive usage data describing, for each computing environment of the plurality of computing environments, characteristics of all users' use of virtual computing resources on the computing environment; and identify, as the one or more additional computing environments, a second computing environment and a third computing environment each associated with corresponding characteristics in the usage data that are desired characteristics.

The computer-executable instructions, when executed by the processor, may further cause the system to: receive user preference data input by the user into a user device displaying a user interface; and, determine that the user preference data identifies one or more of the one or more additional computing environments. The computer-executable instructions, when executed by the processor, may further cause the system to: determine that a target computing environment is associated with a corresponding tier of the multi-tier framework; access tier data describing the multi-tier framework to obtain one or more virtual resource limits associated with the corresponding tier; and, cause the target computing environment to begin processing requests associated with the user identifier using one or more of the one or more virtual resource limits. Each of the one or more virtual resource limits may be associated with a corresponding range of a plurality of ranges of values of a user metric describing a level of confidence that activity associated with the user identifier is not malicious, and the computer-executable instructions, when executed by the processor, may further cause the system to: determine a current value of the user metric; determine that the current value is within a first range of the plurality of ranges; determine that the first range is associated with a first virtual resource limit of the one or more virtual resource limits; and cause the target computing environment to begin processing requests associated with the user identifier using the first virtual resource limit. Each of the one or more virtual resource limits may be associated with a corresponding type of a plurality of types of virtual computing resource, and the computer-executable instructions, when executed by the processor, may further cause the system to cause the target computing environment to: determine a first type of virtual computing resources requested in a request associated with the user identifier; and, process the request using the corresponding virtual resource limit associated with the first type.

The computer-executable instructions, when executed by the processor, may further cause the system to: receive second request data describing a second request to use virtual computing resources in a second computing environment; determine, based on the second request data, that the second request is associated with the user identifier; determine that use, associated with the user identifier, of virtual computing resources in the second computing environment is limited according to the second tier of the multi-tier framework; determine a rate at which the system is receiving potentially malicious requests, associated with the user identifier, to use virtual computing resources in any of the second subset of computing environments, the second subset including the second computing environment; determine that the rate is at or below a threshold rate indicating potential malicious activity; cause the second computing environment to limit the use, associated with the user identifier, of virtual computing resources according to the third tier of the multi-tier framework; and, remove the second computing environment from the second subset. To determine the rate, the computer-executable instructions, when executed by the processor, may further cause the system to: generate usage data for a time period beginning at receipt, by a resource allocation system in communication with the system, of the second request, the usage data including the potentially malicious requests that are received by the resource allocation system during the time period; and, calculate the rate based on the number of the potentially malicious requests in the usage data and the length of the time period.

The computer-executable instructions, when executed by the processor, may further cause the system to: receive second request data describing a second request to use virtual computing resources in a second computing environment; determine that the second request is associated with the user identifier; determine that use, associated with the user identifier, of virtual computing resources in the second computing environment is limited according to the second tier of the multi-tier framework; determine a rate at which the system is receiving potentially malicious requests, associated with the user identifier, to use virtual computing resources in any of the second subset of computing environments, the second subset including the second computing environment; determine that the rate is above a threshold rate indicating potential malicious activity; and, perform an action associated with a threat of malicious activity associated with the user identifier.

In another aspect, the present disclosure provides a method that includes the steps of: causing a first computing environment to limit allocation, to a user identifier, of virtual computing resources according to a first tier of a multi-tier framework of limits; receiving a first request to use virtual computing resources in the first computing environment; determining that the first request is associated with the user identifier; receiving an indicator that the user identifier is validated to the first computing environment, the indicator based on part on the first request; causing one or more validated computing environments, including the first computing environment, to limit allocation, to the user identifier, of virtual computing resources according to a third tier of the multi-tier framework; and, causing one or more non-validated computing environments to limit allocation, to the user identifier, of virtual computing resources according to a second tier of the multi-tier framework, the second tier imposing higher limits than the first tier and lower limits than the third tier.

The multi-tier framework may include a plurality of resource limits associated with the second tier, and causing the one or more non-validated computing environments to limit allocation may include configuring each of the one or more non-validated computing environments to, when a corresponding resource limit of the plurality of resource limits is reached: stop allocating virtual computing resources to the user identifier; and, generate an error message in response to an additional request, associated with the user identifier, to use virtual computing resources in the corresponding non-validated computing environment. The method may further include the steps of: receiving, from the one or more non-validated computing environments, a plurality of error messages each indicating the plurality of resource limits in the second tier have been reached; and, increasing each of the plurality of resource limits in the second tier. The method may further include the steps of: receiving a second request to use virtual computing resources in a second computing environment of the one or more non-validated computing environments; determining that the second request is associated with the user identifier; determining a rate at which the system is receiving potentially malicious requests, associated with the user identifier, to use virtual computing resources in any of the one or more non-validated computing environments; determining that the rate is at or below a threshold rate indicating potential malicious activity; causing the second computing environment to limit the use, associated with the user identifier, of virtual computing resources according to the third tier of the multi-tier framework; and, moving the second computing environment from the one or more non-validated computing environments to the one or more validated computing environments.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A system, comprising:
   a first electronic data store storing tier data that includes:
      a first record including a first tier of limits, a second tier of limits that is less restrictive than the first tier of limits, and a third tier of limits that is less restrictive than the second tier; and
      selection logic for identifying one or more candidate high-use computing environments based on one or more input parameters; and
   one or more hardware computing devices including specific computer-executable instructions that upon execution cause the system to:
      receive a notification that a user account has been registered with a computing resource service provider that provides a plurality of computing environments communicatively isolated from each other, the notification including user account information;
      cause concurrent execution, within each of the plurality of computing environments, of virtual machine instances associated with the user account to be limited according to the first tier of limits;
      receive first request data describing a first request to launch a first virtual machine instance within a first computing environment of the plurality of computing environments, the first request associated with the user account;
      identify, using at least the selection logic, one or more high-use computing environments of the plurality of computing environments;
      perform an initial security assessment of the first request; and
      in response to the initial security assessment of the first request, cause limits on the concurrent execution, within the plurality of computing environments, of virtual machine instances associated with the user account to be updated, the concurrent execution within the first computing environment and the one or more high-use computing environments being limited according to the third tier of limits, and the concurrent execution within each other computing environment of the plurality of computing environments being limited according to the second tier of limits.

2. The system of claim 1, wherein the specific computer-executable instructions upon execution further cause the system to:
   receive second request data describing a second request to launch a second virtual machine instance in a second computing environment in which the concurrent execution of virtual machine instances is limited according to the second tier of limits;
   cause usage data to be generated, the usage data describing activity associated with the user account within the plurality of computing environments and including a rate at which a plurality of launch requests associated with the user account were received by the system, the plurality of launch requests each identifying a corresponding computing environment, of the plurality of computing environments, in which the concurrent execution is limited according to the second tier of limits, the plurality of launch requests including the second request;
   determine that the rate is at or below a threshold rate indicating potential malicious activity; and
   cause the concurrent execution within the second computing environment to be limited according to the third tier of limits.

3. The system of claim 1, wherein:
   the first record is associated with a first type of a plurality of instance types;
   the first tier of limits is associated in the first record with a first range of values of a user metric describing a level of confidence that activity associated with the user account is not malicious;
   the second tier of limits is associated in the first record with a second range of values of the user metric, the values of the second range being greater than the values of the first range;
   the third tier of limits is associated in the first record with a third range of values of the user metric, the values of the third range being greater than the values of the second range; and
   the specific computer-executable instructions upon execution further cause the system to:
      receive a current value of the user metric;
      determine that the current value is within the first range of values; and
      determine that the first request is for a first virtual machine instance of the first instance type.

4. The system of claim 1, wherein the specific computer-executable instructions upon execution further cause the system to:
- receive usage data describing activity associated with the user account within the plurality of computing environments and including a frequency at which error messages are generated, the error messages indicating that processing a received request would cause, within a receiving computing environment associated with the received request, the second tier of limits to be exceeded;
- determine that the frequency exceeds a predetermined acceptable error message frequency; and
- modify, within the first record, the second tier of limits to be less restrictive.

5. The system of claim 1, wherein to identify a second computing environment of the plurality of computing environments as one or of one or more high-use computing environments, the specific computer-executable instructions upon execution further cause the system to evaluate the selection logic using, as the one or more input parameters, information associated with the first computing environment, information associated with the second computing environment, and at least part of the user account information, to determine that the second computing environment has one or both of a geographic proximity to the first computing environment, and a greater global usage rate than the first computing environment, the global usage rate measuring usage of a given computing environment by all registered users of the computing resource service provider.

6. A system, comprising a processor and memory storing specific computer-executable instructions that, when executed by the processor, cause the system to:
- receive first request data describing a first request to use virtual computing resources in one of a plurality of computing environments;
- determine, based on the first request data, that the first request is associated with a user identifier;
- determine that each of the plurality of computing environments limits use, associated with the user identifier, of virtual computing resources according to a first tier of a multi-tier framework of limits;
- receive a first result of a first security assessment of the first request and a user associated with the user identifier;
- determine that the first result validates the user to a first computing environment of the plurality of computing environments;
- in response to receiving the first result, cause each computing environment in a first subset of the plurality of computing environments to limit the use, associated with the user identifier, of virtual computing resources according to a third tier of the multi-tier framework, the first subset including the first computing environment and one or more additional computing environments; and
- in response to receiving the first result, cause each computing environment in a second subset of the plurality of computing environments to limit the use, associated with the user identifier, of virtual computing resources according to a second tier of the multi-tier framework, the second subset including one or more of the computing environments not included in the first sub set.

7. The system of claim 6, wherein the user identifier identifies a user account, the first request is the first request associated with the user account that is received by the system subsequent to a registration of the user account to use virtual computing resources in the plurality of computing environments, and the first security assessment is based on the user account and the first request data.

8. The system of claim 6, wherein the second tier is less limiting than the first tier, and the third tier is less limiting than the second tier, on the use associated with the user identifier.

9. The system of claim 6, wherein the second subset includes each computing environment, of the plurality of computing environments, that is not included in the first subset.

10. The system of claim 6, wherein the first request is to use virtual computing resources in the first computing environment, and the computer-executable instructions, when executed by the processor, further cause the system to:
- receive usage data describing, for each computing environment of the plurality of computing environments, characteristics of all users' use of virtual computing resources on the computing environment; and
- identify, as the one or more additional computing environments, a second computing environment and a third computing environment each associated with corresponding characteristics in the usage data that are desired characteristics.

11. The system of claim 6, wherein the computer-executable instructions, when executed by the processor, further cause the system to:
- receive user preference data input by the user into a user device displaying a user interface; and
- determine that the user preference data identifies one or more of the one or more additional computing environments.

12. The system of claim 6, wherein the computer-executable instructions, when executed by the processor, further cause the system to:
- determine that a target computing environment is associated with a corresponding tier of the multi-tier framework;
- access tier data describing the multi-tier framework to obtain one or more virtual resource limits associated with the corresponding tier; and
- cause the target computing environment to begin processing requests associated with the user identifier using one or more of the one or more virtual resource limits.

13. The system of claim 12, wherein each of the one or more virtual resource limits is associated with a corresponding range of a plurality of ranges of values of a user metric describing a level of confidence that activity associated with the user identifier is not malicious, and the computer-executable instructions, when executed by the processor, further cause the system to:
- determine a current value of the user metric;
- determine that the current value is within a first range of the plurality of ranges;
- determine that the first range is associated with a first virtual resource limit of the one or more virtual resource limits; and
- cause the target computing environment to begin processing requests associated with the user identifier using the first virtual resource limit.

14. The system of claim 12, wherein each of the one or more virtual resource limits is associated with a corresponding type of a plurality of types of virtual computing resource, and the computer-executable instructions, when executed by the processor, further cause the system to cause the target computing environment to:

determine a first type of virtual computing resources requested in a request associated with the user identifier; and process the request using the corresponding virtual resource limit associated with the first type.

15. The system of claim 6, wherein the computer-executable instructions, when executed by the processor, further cause the system to:
receive second request data describing a second request to use virtual computing resources in a second computing environment;
determine, based on the second request data, that the second request is associated with the user identifier;
determine that use, associated with the user identifier, of virtual computing resources in the second computing environment is limited according to the second tier of the multi-tier framework;
determine a rate at which the system is receiving potentially malicious requests, associated with the user identifier, to use virtual computing resources in any of the second subset of computing environments, the second subset including the second computing environment;
determine that the rate is at or below a threshold rate indicating potential malicious activity;
cause the second computing environment to limit the use, associated with the user identifier, of virtual computing resources according to the third tier of the multi-tier framework; and
remove the second computing environment from the second subset.

16. The system of claim 15, wherein to determine the rate, the computer-executable instructions, when executed by the processor, further cause the system to:
generate usage data for a time period beginning at receipt, by a resource allocation system in communication with the system, of the second request, the usage data including the potentially malicious requests that are received by the resource allocation system during the time period; and
calculate the rate based on the number of the potentially malicious requests in the usage data and the length of the time period.

17. The system of claim 6, wherein the computer-executable instructions, when executed by the processor, further cause the system to:
receive second request data describing a second request to use virtual computing resources in a second computing environment;
determine that the second request is associated with the user identifier;
determine that use, associated with the user identifier, of virtual computing resources in the second computing environment is limited according to the second tier of the multi-tier framework;
determine a rate at which the system is receiving potentially malicious requests, associated with the user identifier, to use virtual computing resources in any of the second subset of computing environments, the second subset including the second computing environment;
determine that the rate is above a threshold rate indicating potential malicious activity; and
perform an action associated with a threat of malicious activity associated with the user identifier.

18. A method, comprising:
causing a first computing environment to limit allocation, to a user identifier, of virtual computing resources according to a first tier of a multi-tier framework of limits;
receiving a first request associated with the user identifier to use virtual computing resources in the first computing environment;
determining that the first request is associated with the user identifier;
performing an initial security assessment of the first request to produce a first result;
receiving an indicator that the user identifier is validated to the first computing environment, the indicator based on part on the first request;
in response to the first result, causing one or more validated computing environments, including the first computing environment, to limit allocation, to the user identifier, of virtual computing resources according to a third tier of the multi-tier framework; and
in response to the first result, causing one or more non-validated computing environments to limit allocation, to the user identifier, of virtual computing resources according to a second tier of the multi-tier framework, the second tier imposing higher limits than the first tier and lower limits than the third tier.

19. The method of claim 18, wherein the multi-tier framework comprises a plurality of resource limits associated with the second tier;
wherein causing the one or more non-validated computing environments to limit allocation comprises configuring each of the one or more non-validated computing environments to, when a corresponding resource limit of the plurality of resource limits is reached:
stop allocating virtual computing resources to the user identifier; and
generate an error message in response to an additional request, associated with the user identifier, to use virtual computing resources in the corresponding non-validated computing environment;
the method further comprising:
receiving, from the one or more non-validated computing environments, a plurality of error messages each indicating the plurality of resource limits in the second tier have been reached; and
increasing each of the plurality of resource limits in the second tier.

20. The method of claim 18, further comprising:
receiving a second request to use virtual computing resources in a second computing environment of the one or more non-validated computing environments;
determining that the second request is associated with the user identifier;
determining a rate at which the system is receiving potentially malicious requests, associated with the user identifier, to use virtual computing resources in any of the one or more non-validated computing environments;
determining that the rate is at or below a threshold rate indicating potential malicious activity;
causing the second computing environment to limit the use, associated with the user identifier, of virtual computing resources according to the third tier of the multi-tier framework; and
moving the second computing environment from the one or more non-validated computing environments to the one or more validated computing environments.

* * * * *